United States Patent
Iwamoto et al.

(10) Patent No.: US 11,628,860 B2
(45) Date of Patent: *Apr. 18, 2023

(54) AUTONOMOUS DRIVING SYSTEM THAT CAN ELIMINATE A SYSTEM DISTRUST STATE OF THE DRIVER

(71) Applicant: Toyota Jidosha Kabushiki Kaisha, Toyota Aichi-ken (JP)

(72) Inventors: Takayuki Iwamoto, Shizuoka (JP); Sho Otaki, Yokohama (JP); Hojung Jung, Susono (JP); Shintaro Shiba, Susono (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 189 days.

This patent is subject to a terminal disclaimer.

(21) Appl. No.: 16/742,161

(22) Filed: Jan. 14, 2020

(65) Prior Publication Data

US 2020/0223450 A1    Jul. 16, 2020

(30) Foreign Application Priority Data

Jan. 16, 2019    (JP) .............................. JP2019-005232

(51) Int. Cl.
*B60W 60/00* (2020.01)
*G05D 1/02* (2020.01)
(Continued)

(52) U.S. Cl.
CPC ........ *B60W 60/0013* (2020.02); *B60W 40/08* (2013.01); *B60W 50/14* (2013.01); *G05D 1/0088* (2013.01); *G05D 1/0212* (2013.01)

(58) Field of Classification Search
None
See application file for complete search history.

(56) References Cited

U.S. PATENT DOCUMENTS 9,964,950 B2    5/2018    Takano
10,017,116 B2    7/2018    Sato
(Continued)

FOREIGN PATENT DOCUMENTS

GB    2583960 A  * 11/2020 ......... G01C 21/3453
JP    2007-230454 A    9/2007
(Continued)

OTHER PUBLICATIONS

Translation of WO 2018193765 A1 (Matsumoto et al.) (Year: 2018).*

(Continued)

*Primary Examiner* — James J Lee
*Assistant Examiner* — Andrew Sang Kim
(74) *Attorney, Agent, or Firm* — Dinsmore & Shohl LLP

(57) ABSTRACT

An autonomous driving system includes a normal driving situation determination unit configured to determine whether or not autonomous driving is in a normal driving situation, a driver situation recognition unit configured to recognize a driver situation, a distrust determination unit configured to determine whether or not the driver is in a system distrust state, based on a recognition result obtained by the driver situation recognition unit, and a warning control unit configured to output an alert in accordance with the external environment of the vehicle when the normal driving situation determination unit determines that autonomous driving is in the normal driving situation and the distrust determination unit determines that the driver is in the system distrust state.

6 Claims, 8 Drawing Sheets

(51) Int. Cl.
  *B60W 50/14* (2020.01)
  *B60W 40/08* (2012.01)
  *G05D 1/00* (2006.01)

(56) References Cited

U.S. PATENT DOCUMENTS

| | | | |
|---|---|---|---|
| 10,310,508 B2 | 6/2019 | Kunisa et al. | |
| 10,421,394 B2 | 9/2019 | Morimura et al. | |
| 10,452,930 B2 | 10/2019 | Sato | |
| 10,663,973 B2 | 5/2020 | Hashimoto et al. | |
| 10,759,425 B2 | 9/2020 | Urano et al. | |
| 10,875,545 B2* | 12/2020 | Iwamoto | B60W 50/14 |
| 10,895,875 B2 | 1/2021 | Hashimoto et al. | |
| 11,001,198 B2 | 5/2021 | Morimura et al. | |
| 11,275,382 B2 | 3/2022 | Hashimoto et al. | |
| 2009/0024357 A1 | 1/2009 | Aso et al. | |
| 2009/0162825 A1 | 6/2009 | Sakai et al. | |
| 2015/0314780 A1* | 11/2015 | Stenneth | B60W 30/00 701/23 |
| 2016/0246298 A1 | 8/2016 | Sato et al. | |
| 2017/0021837 A1 | 1/2017 | Ebina | |
| 2017/0038774 A1 | 2/2017 | Ebina | |
| 2017/0261982 A1 | 9/2017 | Otaki et al. | |
| 2018/0120840 A1 | 5/2018 | Palmer et al. | |
| 2019/0094865 A1* | 3/2019 | Fletcher | G05D 1/0274 |
| 2020/0180657 A1 | 6/2020 | Iwamoto et al. | |
| 2020/0283027 A1* | 9/2020 | Okuyama | B60W 30/18154 |
| 2021/0276567 A1* | 9/2021 | Othersen | B60K 35/00 |

FOREIGN PATENT DOCUMENTS

| | | | |
|---|---|---|---|
| JP | 2008-117140 A | | 5/2008 |
| JP | 2008-158969 A | | 7/2008 |
| JP | 2009-157502 A | | 7/2009 |
| JP | 2015-032054 A | | 2/2015 |
| JP | 2015-032291 A | | 2/2015 |
| JP | 2015-210660 A | | 11/2015 |
| JP | 2016-066279 A | | 4/2016 |
| JP | 2017-162406 A | | 9/2017 |
| JP | 2019048486 A | * | 3/2019 |
| KR | 101708676 B1 | * | 3/2017 |
| WO | 2015/151243 A1 | | 10/2015 |
| WO | 2015/162784 A1 | | 10/2015 |
| WO | WO-2018193765 A1 | * | 10/2018 ............ B60W 40/06 |

OTHER PUBLICATIONS

Translation of KR-101708676-B1 (Year: 2017).*
Office Action pertaining to corresponding U.S. Appl. No. 16/704,640 dated Jun. 12, 2020.

* cited by examiner

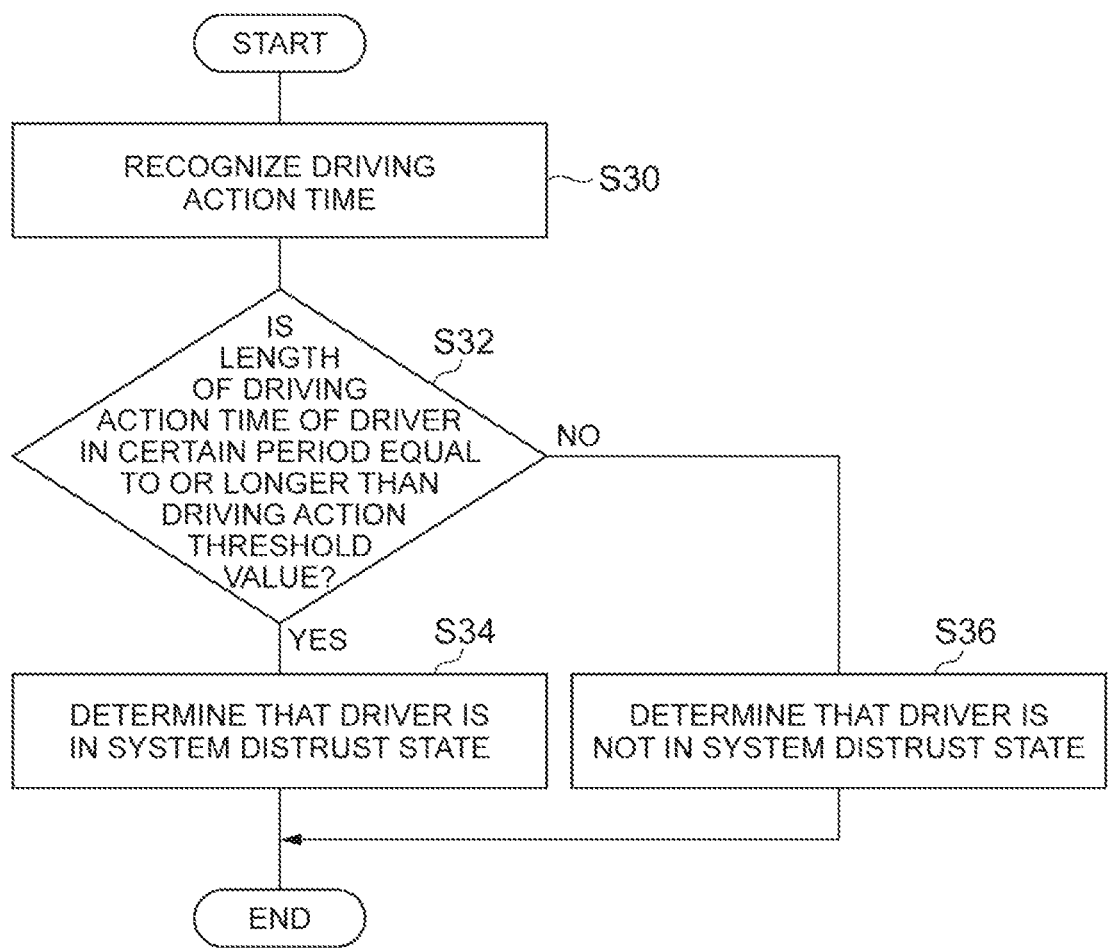

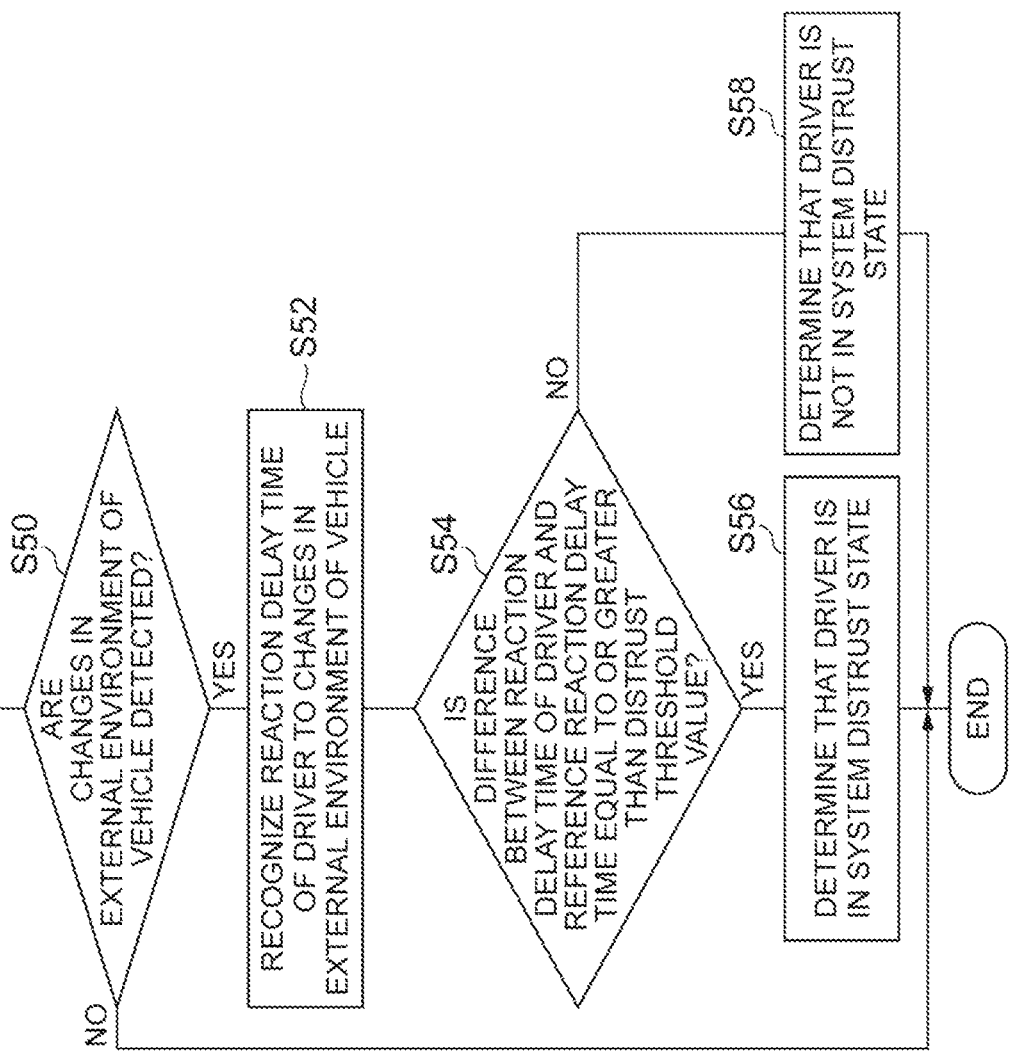
Fig.7A / Fig.7B

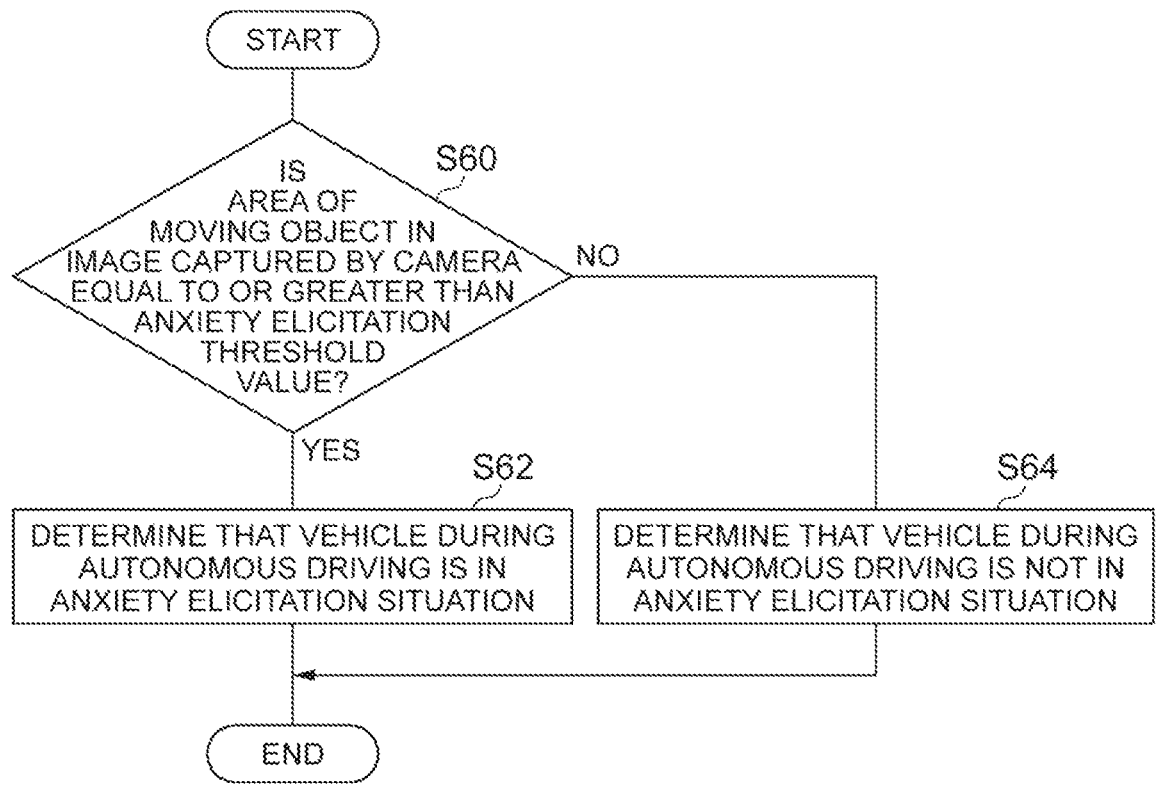

AUTONOMOUS DRIVING SYSTEM THAT CAN ELIMINATE A SYSTEM DISTRUST STATE OF THE DRIVER

CROSS-REFERENCE TO RELATED APPLICATION

This application claims the benefit of priority from Japanese Patent Application No. 2019-005232, filed Jan. 16, 2019, the entire contents of which are incorporated herein by reference.

TECHNICAL FIELD

The present disclosure relates to an autonomous driving system.

BACKGROUND

In the related art, Japanese Unexamined Patent Publication No. 2015-032054 is known as technical literature relating to an autonomous driving system. The publication discloses an over-dependence deterrence device which determines the driver's overconfidence in a driving support system that supports driving of a vehicle, and when it is determined that the driver is in an overconfidence state, performs at least one of a warning to the driver that the driver is in the overconfidence state and suppression of driving support control.

SUMMARY

Incidentally, in recent years, a development of an autonomous driving system capable of performing autonomous driving under certain conditions, has been promoted. In such an autonomous driving, if the system makes false attention awakening, the driver may not trust the autonomous driving system. When the driver has a distrust of the autonomous driving system, a problem occurs that the driver does not trust the warning of the system, thus it is desired to handle the above issue.

Therefore, in the technical field, it is desired to provide an autonomous driving system that can eliminate a system distrust state of the driver during autonomous driving.

An aspect of the present disclosure is an autonomous driving system that performs autonomous driving of a vehicle and performs various warnings to a driver of the vehicle during autonomous driving, the system including a vehicle position recognition unit configured to recognize a position of the vehicle on a map, an external environment recognition unit configured to recognize an external environment of the vehicle, a travel state recognition unit configured to recognize a travel state of the vehicle, a trajectory generation unit configured to generate a trajectory of the vehicle used for the autonomous driving, based on map information, the position of the vehicle on the map, the external environment of the vehicle, and the travel state of the vehicle, a normal driving situation determination unit configured to determine whether or not autonomous driving is in a normal driving situation, based on at least one of the position of the vehicle on the map, the external environment of the vehicle, the travel state of the vehicle, and the trajectory of the vehicle, a driver situation recognition unit configured to recognize a driver situation including at least one of a driving action time of the driver, a non-driving action time of the driver, and a reaction delay time of the driver with respect to a change in the external environment of the vehicle, a distrust determination unit configured to determine whether or not the driver is in a system distrust state, based on a recognition result obtained by the driver situation recognition unit, and a warning control unit configured to output an alert in accordance with the external environment of the vehicle, when the normal driving situation determination unit determines that autonomous driving is in the normal driving situation and the distrust determination unit determines that the driver is in the system distrust state.

According to the autonomous driving system according to the aspect of the present disclosure, an alert is output in accordance with the external environment of the vehicle, when the normal driving situation determination unit determines that autonomous driving is in the normal driving situation and the distrust determination unit determines that the driver is in the system distrust state. In this way, in the autonomous driving system, it is possible to appropriately eliminate the system distrust state of the driver during autonomous driving by encouraging the driver who is in the system distrust state by outputting the alert in accordance with the external environment while ensuring that autonomous driving is in the normal driving situation.

In the autonomous driving system according to the aspect of the present disclosure, a system confidence degree calculation unit is further included to be configured to calculate a system confidence degree regarding the autonomous driving based on at least one of the position of the vehicle on the map, the external environment of the vehicle, the travel state of the vehicle, and the trajectory of the vehicle, and the normal driving situation determination unit may determine that autonomous driving is not in the normal driving situation, when the system confidence degree is lower than a normal driving threshold value.

In the autonomous driving system according to the aspect of the present disclosure, an anxiety elicitation situation determination unit is further included to be configured to determine whether or not the vehicle during autonomous driving is in an anxiety elicitation situation based on the external environment of the vehicle, and the warning control unit outputs the alert when the anxiety elicitation situation determination unit determines that the vehicle is in the anxiety elicitation situation in case where the normal driving situation determination unit determines that autonomous driving is in the normal driving situation and the distrust determination unit determines that the driver is in the system distrust state, and may not output the alert when the anxiety elicitation situation determination unit determines that the vehicle is not in the anxiety elicitation situation, in case where the normal driving situation determination unit determines that autonomous driving is in the normal driving situation and the distrust determination unit determines that the driver is in the system distrust state.

In the autonomous driving system according to the aspect of the present disclosure, the anxiety elicitation situation determination unit determines that the vehicle during autonomous driving is in the anxiety elicitation situation, if an area of a moving object in a captured image by a camera that images the front of the vehicle as the external environment of the vehicle is equal to or greater than an anxiety elicitation threshold value.

According to the aspect of the present disclosure, it is possible to eliminate the system distrust state of the driver during autonomous driving.

BRIEF DESCRIPTION OF THE DRAWINGS

FIG. 6 is a flowchart illustrating an example of system distrust state determination processing.

FIG. 7A is a flowchart illustrating an example of reference reaction delay time storage processing.

FIG. 7B is a flowchart illustrating another example of system distrust state determination processing.

FIG. 8 is a flowchart illustrating an example of anxiety elicitation situation determination processing.

DETAILED DESCRIPTION

Hereinafter, embodiments of the present disclosure will be described with reference to the drawings.

Figure 1:
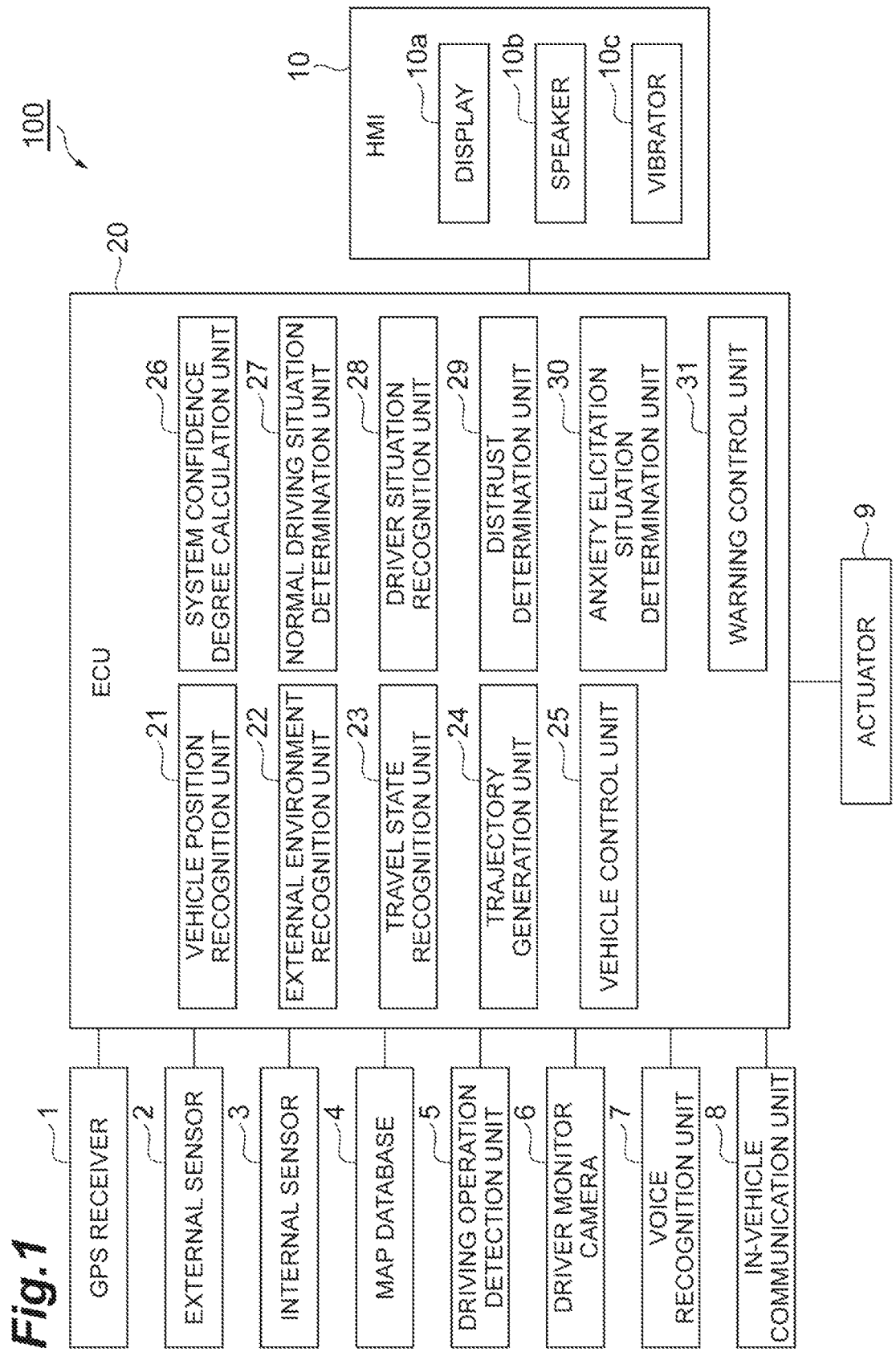
FIG. 1 is a block diagram illustrating an autonomous driving system according to a first embodiment.

FIG. 1 is a block diagram illustrating an autonomous driving system according to a first embodiment. An autonomous driving system 100 illustrated in FIG. 1 is mounted on a vehicle such as a passenger car, and performs autonomous driving of the vehicle. Autonomous driving is a vehicle control that causes the vehicle to autonomously travel toward a destination set in advance. During autonomous driving, the driver does not need to perform a driving operation of steering, and the vehicle travels autonomously. In addition, the autonomous driving system 100 performs various warnings to the driver of the vehicle during autonomous driving. Details of the warning will be described below.

Configuration of Autonomous Driving System

As illustrated in FIG. 1, the autonomous driving system 100 includes an electronic control unit (ECU) 20 that performs overall management of the system. The ECU 20 is an electronic control unit including a central processing unit (CPU), a read only memory (ROM), a random access memory (RAM), and the like. In the ECU 20, for example, various functions are realized by loading a program stored in the ROM into the RAM and causing the CPU to execute the program loaded in the RAM. The ECU 20 may be configured with a plurality of electronic units.

The ECU 20 is connected to a GPS receiver 1, an external sensor 2, an internal sensor 3, a map database 4, a driving operation detection unit 5, a driver monitor camera 6, a voice recognition unit 7, an in-vehicle communication unit 8, an actuator 9, and a human machine interface (HMI) 10.

The GPS receiver 1 measures a position of the vehicle (for example, the latitude and longitude of the vehicle) by receiving signals from three or more GPS satellites. The GPS receiver 1 transmits the measured position information of the vehicle to the ECU 20. Instead of the GPS receiver 1, a global navigation satellite system (GNSS) receiver may be used.

The external sensor 2 is a detection device that detects a surrounding situation of the vehicle. The external sensor 2 includes at least one of a camera and a radar sensor.

The camera is an imaging device that images an external situation of the vehicle. The camera is provided on the inside of a windshield of the vehicle. The camera transmits imaging information on the external situation of the vehicle to the ECU 20. The camera may be a monocular camera or a stereo camera.

The radar sensor is a detection device that detects objects around the vehicle using at least one of radio waves (for example, millimeter waves) and light. The radar sensor includes, for example, at least one of the millimeter wave radar and a light detection and ranging (LIDAR). The radar sensor transmits at least one of the radio wave and the light to the surroundings of the vehicle, and detects the objects by receiving radio waves or light reflected from the objects. The radar sensor transmits the detected object information to the ECU 20. The objects include fixed objects such as guard rails and buildings, as well as moving objects such as pedestrians, bicycles, and other vehicles. The external sensor 2 does not necessarily need to include the radar sensor.

The internal sensor 3 is a detection device that detects a travel state of the vehicle. The internal sensor 3 includes a vehicle speed sensor, an acceleration sensor, and a yaw rate sensor. The vehicle speed sensor is a measuring device that measures a speed of the vehicle. As the vehicle speed sensor, for example, a vehicle wheel speed sensor is used, which is provided in at least one of the vehicle wheels of the vehicle and a drive shaft rotating integrally with vehicle wheels, and measures a rotational speed of the vehicle wheels. The vehicle speed sensor transmits the measured vehicle speed information to the ECU 20.

The acceleration sensor is a measuring device that measures an acceleration of the vehicle. The acceleration sensor includes, for example, a longitudinal acceleration sensor that measures acceleration in a longitudinal direction of the vehicle and a lateral acceleration sensor that measures a lateral acceleration of the vehicle. The acceleration sensor transmits, for example, the acceleration information of the vehicle to the ECU 20. The yaw rate sensor is a measuring device that measures a yaw rate (rotation angular velocity) around the vertical axis at the center of gravity of the vehicle. As the yaw rate sensor, for example, a gyro sensor can be used. The yaw rate sensor transmits the measured yaw rate information of the vehicle to the ECU 20.

The map database 4 is a database that stores map information. The map database 4 is formed, for example, in a hard disk drive (HDD) mounted on the vehicle. The map information includes position information on a lane, information on a shape of the lane (for example, a curve, a lane width, or the like), position information on a stop line, information on positions of an intersection and a branch, and position information on structures. The map information may also include speed related information such as a legal speed associated with at least one of the position and a section on the map. The map information may also include position information on marking objects such as utility poles, used for vehicle position recognition. The map database 4 may be stored in a server that can communicate with the vehicle.

The driving operation detection unit 5 detects the operation of the operation unit of the vehicle by the driver. The driving operation detection unit 5 includes, for example, a steering sensor, an accelerator sensor, and a brake sensor. The operation unit of the vehicle is a device to which the driver inputs the operation for driving the vehicle. The operation unit of the vehicle includes at least one of a steering unit of the vehicle, an accelerator operation unit of the vehicle, and a brake operation unit of the vehicle. The steering unit is, for example, a steering wheel. The steering unit is not limited to have a wheel shape, but need only have a configuration that functions as a steering wheel. The accelerator operation unit is, for example, an accelerator pedal. The brake operation unit is, for example, a brake pedal. The accelerator operation unit and the brake operation unit do not necessarily need to be pedals, and need only have a configuration in which the driver can input acceleration or deceleration.

The steering sensor includes a steering touch sensor that detects gripping of the steering unit of the driver. For example, a capacitance type touch sensor can be used as the steering touch sensor. The steering touch sensor is provided on the left and right sides of the steering unit to detect the gripping of the driver's hands. The steering sensor may measure an operation amount of the steering unit by the driver. The operation amount of the steering unit includes at least one of a steering angle and a steering torque.

The accelerator sensor measures an operation amount of the accelerator operation unit by the driver. The operation amount of the accelerator operation unit includes, for example, a depression amount of the accelerator pedal. The brake sensor measures an operation amount of the brake operation unit by the driver. The operation amount of the brake operation unit includes, for example, a depression amount of the brake pedal. The operation amounts of the accelerator operation unit and the brake operation unit may include the depression speed. The driving operation detection unit 5 transmits operation amount information on the measured operation amount by the driver to the ECU 20.

The driver monitor camera 6 is an imaging device that images the driver of the vehicle. The driver monitor camera 6 is provided, for example, at the position of the front of the driver on the cover of a steering column of the vehicle, and images the driver. A plurality of driver monitor cameras 6 may be provided to image the driver from a plurality of directions. The driver monitor camera 6 transmits imaging information on the driver to the ECU 20. The autonomous driving system 100 does not necessarily need to use the driver monitor camera 6.

The voice recognition unit 7 is a device that recognizes the voice of an occupant in the vehicle compartment. The voice recognition unit 7 includes, for example, a microphone for collecting the voice in the vehicle compartment. A plurality of microphones may be provided in the vehicle compartment. The voice recognition unit 7 transmits the result of the recognition of the voice of the occupant in the vehicle compartment to the ECU 20. The voice recognition unit 7 does not necessarily need to recognize the voice of the occupant as a language, and may only determine whether or not the occupants are in conversation. The voice recognition unit 7 may have a personal authentication function using a voice, and may determine whether or not the driver is in conversation based on the voice.

The voice recognition unit 7 may be, for example, always in a voice recognition state, and may function as a so-called smart speaker. In addition, the voice recognition unit 7 may configure a part of the HMI 10 described below. The voice recognition unit 7 may recognize a sound (such as a traveling sound of another vehicle, an engine sound of another vehicle, or the like) reaching the vehicle compartment from the outside of the vehicle. The autonomous driving system 100 does not necessarily need to use the voice recognition unit 7.

The in-vehicle communication unit 8 is a device for the ECU 20 to communicate with various information terminals in the vehicle. The various information terminals include, for example, at least one of smartphones, tablet personal computers, and wearable devices owned by the occupant. The wearable devices include watch-type wearable devices, glasses-type wearable devices, and the like. The in-vehicle communication unit 8 communicates with the information terminals to acquire information such as whether or not the smartphones are in operation. The in-vehicle communication unit 8 may acquire driver's biometric information by communicating with the wearable devices. The biometric information includes at least one of heartbeat, brain waves, blood pressure, body temperature, and the like. The in-vehicle communication unit 8 transmits the various information acquired by the communication to the ECU 20. The autonomous driving system 100 does not necessarily need to use the in-vehicle communication unit 8.

The actuator 9 is a device used to control the vehicle. The actuator 9 includes at least a throttle actuator, a brake actuator, and a steering actuator. The throttle actuator controls a driving force of the vehicle by controlling an amount of air (throttle opening degree) supplied to the engine according to the control signal from the ECU 20. If the vehicle is a hybrid vehicle, in addition to the amount of air supplied to the engine, the control signal from the ECU 20 is input to a motor as a power source, and the driving force of the vehicle is controlled. If the vehicle is an electric vehicle, the control signal from the ECU 20 is input to a motor as a power source instead of the throttle actuator, and the driving force of the vehicle is controlled. The motor as the power source in these cases configures the actuator 9.

The brake actuator controls the brake system according to the control signal from the ECU 20 and controls a braking force applied to the wheels of the vehicle. For example, a hydraulic brake system can be used as the brake system. The steering actuator controls the driving of an assist motor that controls the steering torque of an electric power steering system, according to the control signal from the ECU 20.

The HMI 10 is a device to perform input and output of the information between the autonomous driving system 100 and the occupant. The HMI 10 includes a display 10a, a speaker 10b, and a vibrator 10c.

The display 10a is a display provided in the vehicle. The display 10a is provided, for example, on a dashboard of the vehicle. The display 10a performs various image displays according to the control signal from the ECU 20. The display 10a may be a head-up display that projects and displays an image on the windshield of the vehicle. The display 10a may include a multi-information display provided on an instrument panel of the vehicle. The display 10a may include a blind spot monitor provided on side view mirrors of the vehicle.

The speaker 10b is a voice output device provided in the vehicle. The speaker 10b is provided, for example, on the inside of the door of the vehicle and on the back of the instrument panel. The speaker 10b performs various voice outputs according to the control signal from the ECU 20.

The vibrator 10c is a vibration actuator for performing a warning to the driver by outputting the vibration. The vibration actuator is provided, for example, on at least one of the steering unit of the vehicle, a seat of the driver's seat, a headrest of the driver's seat, an armrest of the driver's seat, the accelerator pedal, and the brake pedal. The vibrator 10c outputs the vibration according to the control signal from the ECU 20. The HMI 10 does not necessarily need to include the vibrator 10c.

Next, a functional configuration of the ECU 20 will be described. The ECU 20 includes a vehicle position recognition unit 21, an external environment recognition unit 22, a travel state recognition unit 23, a trajectory generation unit 24, a vehicle control unit 25, a system confidence degree calculation unit 26, a normal driving situation determination unit 27, and a driver situation recognition unit 28, a distrust determination unit 29, an anxiety elicitation situation determination unit 30, and a warning control unit 31. A part of the functions of the ECU 20 described below may be performed on the server capable of communicating with the vehicle.

The vehicle position recognition unit 21 recognizes the position of the vehicle on the map based on the position information in the GPS receiver 1 and the map information in the map database 4. In addition, the vehicle position recognition unit 21 may estimate the position of the vehicle on the map by the simultaneous localization and mapping (SLAM) technology using the position information of the marking object included in the map information in the map database 4 and the result of the detection performed by the external sensor 2. The vehicle position recognition unit 21 may recognize the position of the vehicle on the map by a well-known method.

The external environment recognition unit 22 recognizes the external environment around the vehicle based on the result of the detection (the object information by the radar sensor and/or the imaging information by the camera) performed by the external sensor 2. The external environment includes a situation of objects around the vehicle. The situation of the object refers to, for example, a relative position and a relative speed of the object to the vehicle.

The external environment may include recognition results of lane lines (a lane boundary line, a center line, and the like) around the vehicle. The external environment recognition unit 22 recognizes the relative position of the lane line to the vehicle by well-known white line recognition based on the result of the detection performed by the external sensor 2. The external environment recognition unit 22 may recognize a sound reaching the vehicle compartment from the outside of the vehicle, which is recognized by the voice recognition unit 7, as a part of the external environment. If an external sound detector (such as a microphone) that detects the sounds outside the vehicle is provided in the vehicle, the external environment recognition unit 22 may recognize the sounds detected by the external sound detector as a part of the external environment.

The travel state recognition unit 23 recognizes the state of the traveling vehicle based on the result of the detection performed by the internal sensor 3. The travel state includes the speed of the vehicle, the acceleration of the vehicle, and the yaw rate of the vehicle. Specifically, the travel state recognition unit 23 recognizes the speed of the vehicle based on the vehicle speed information from the vehicle speed sensor. The travel state recognition unit 23 recognizes the acceleration (a longitudinal acceleration and a lateral acceleration) of the vehicle based on the acceleration information from the acceleration sensor. The travel state recognition unit 23 recognizes the yaw rate of the vehicle based on the yaw rate information from the yaw rate sensor.

The trajectory generation unit 24 generates a trajectory to be used for the autonomous driving of the vehicle. The trajectory generation unit 24 generates the trajectory for the autonomous driving based on a destination set in advance, the map information in the map database 4, the position of the vehicle on the map recognized by vehicle position recognition unit 21, the external environment of vehicle recognized by external environment recognition unit 22, and the travel state (the vehicle speed, the yaw rate, and the like) recognized by the travel state recognition unit 23. The destination may be set by the occupant of the vehicle, or may be proposed by at least one of the autonomous driving system 100 and a well-known navigation system.

The trajectory generation unit 24 obtains a traveling route for the autonomous driving based on the destination, the map information, and the position of the vehicle on the map. The traveling route is a route on which the vehicle travels by autonomous driving, and is a route from the position of the vehicle on the map (the current position) to the destination. The traveling route may be set by a well-known navigation system. The traveling route can be represented as a route on a lane-by-lane basis, for example. The trajectory generation unit 24 generates a trajectory for autonomous driving of the vehicle along the traveling route based on the map information.

The trajectory includes a path on which the vehicle travels by autonomous driving, and the vehicle speed profile during autonomous driving. The path is a trajectory on which the vehicle during autonomous driving is planned to travel on the traveling route. The path can be data of the steering angle change (a steering angle profile) of the vehicle corresponding to the position on the traveling route, for example. The position on the traveling route is, for example, a set longitudinal position which is set at predetermined intervals (for example, 1 m) in the traveling direction of the traveling route. The steering angle profile is data in which the target steering angle is associated with each set longitudinal position.

The trajectory generation unit 24 generates the path on which the vehicle travels, based on the traveling route, the map information, the external environment of the vehicle, and the travel state of the vehicle, for example. The trajectory generation unit 24 generates the path such that the vehicle passes through the center of the lane included in the traveling route.

The vehicle speed profile is data in which a target vehicle speed is associated with each set longitudinal position, for example. The set longitudinal position may be set based on the traveling time of the vehicle instead of the distance. The set longitudinal position may be set as an arrival position of the vehicle after 1 seconds and the arrival position of the vehicle after 2 seconds.

The trajectory generation unit 24 generates the vehicle speed profile based on, for example, speed related information such as a legal speed included in the path and the map information. Instead of the legal speed, a set speed may be used, which is set in advance for at least one of the position and the section on the map. The trajectory generation unit 24 generates the trajectory for the autonomous driving based on the path and the vehicle speed profile. The trajectory is not limited to the description above. The trajectory need only include information necessary to realize the autonomous driving of the vehicle.

The vehicle control unit 25 performs the autonomous driving of the vehicle. The vehicle control unit 25 performs the autonomous driving of the vehicle based on the map information, the position of the vehicle on the map, the external environment of the vehicle, the travel state of the vehicle, and the trajectory. The vehicle control unit 25 performs the autonomous driving along the trajectory generated by the trajectory generation unit 24 and autonomously performs emergency avoidance and the like in an emergency. The vehicle control unit 25 performs the autonomous driving of the vehicle by transmitting the control signals to the actuator 9.

The system confidence degree calculation unit 26 calculates a system confidence degree regarding the autonomous driving by the autonomous driving system 100 based on at least one of the position of the vehicle on the map, the external environment of the vehicle, the travel state of the vehicle, and the trajectory of the vehicle. The system confidence degree is an index indicating the reliability (certainty) of the autonomous driving in the autonomous driving system 100. The system confidence degree corresponds to the possibility of continuity of autonomous driving.

If the system confidence degree falls below a termination threshold value, the autonomous driving system 100 may end the autonomous driving control and switch the driving mode to a driver-based driving. The driver-based driving includes manual driving by a driver (full manual driving) and driving by a driver supported by a driving support control such as adaptive cruise control (ACC) and lane keeping assist (LKA). The termination threshold value is a threshold value of a value set in advance. Hereinafter, various "threshold values" used in the description of the present specification mean threshold values set in advance.

The system confidence degree calculation unit 26 calculates the system confidence degree based on, for example, the external environment of the vehicle recognized by the external environment recognition unit 22. Specifically, when the number of moving objects such as other vehicles around the vehicle is equal to or greater than a certain number, the system confidence degree calculation unit 26 may calculate the system confidence degree as a lower value compared to when the number of moving objects around the vehicle is less than the certain number. If there is a preceding vehicle within a certain distance in front of the vehicle, the system confidence degree calculation unit 26 may calculate the system confidence degree as a lower value compared to when there is no preceding vehicle.

If there is a preceding vehicle within a certain distance in front of the vehicle, the system confidence degree calculation unit 26 may calculate the system confidence degree as a lower value, as the vehicle-to-vehicle distance between the vehicle and the preceding vehicle becomes shorter. If there is a following vehicle within a certain distance behind the vehicle, the system confidence degree calculation unit 26 may calculate the system confidence degree as a lower value compared to when there is no following vehicle. If there is a parallel traveling vehicle that travels side by side with the vehicle, the system confidence degree calculation unit 26 may calculate the system confidence degree as a lower value compared to when there is no parallel traveling vehicle.

If there is an object in front of the vehicle with a time to collision (TTC) shorter than a TTC threshold value, the system confidence degree calculation unit 26 may calculate the system confidence degree as a lower value compared to when there is no object in front of the vehicle with a time to collision shorter than the TTC threshold value. The vehicle-to-vehicle time may be used instead of the time to collision.

If there is a pedestrian within a certain distance from the vehicle in the traveling direction of the vehicle, the system confidence degree calculation unit 26 may calculate the system confidence degree as a lower value compared to a case where there is no pedestrian. If there is a pedestrian moving in the direction crossing the trajectory of the vehicle, the system confidence degree calculation unit 26 may calculate the system confidence degree as a lower value compared to when there is no pedestrian. The same can be applied to bicycles and a personal mobility instead of the pedestrians.

If another vehicle around the vehicle performs abnormal behavior, the system confidence degree calculation unit 26 may calculate the system confidence degree as a lower value compared to when the other vehicle does not perform the abnormal behavior. The abnormal behavior is an unusual behavior that another vehicle is not supposed to do in a standard traveling situation. The abnormal behavior can include rapid deceleration, rapid acceleration, rapid steering, lighting of a hazard lamp, and the like. If another vehicle around the vehicle deviates from the normal behavior set in advance, the system confidence degree calculation unit 26 may recognize that the abnormal behavior is being performed. The normal behavior can refer to that, for example, the acceleration and deceleration is equal to or lower than the threshold value, and refer to traveling along the lane at a speed equal to or lower than the legal maximum speed of the lane.

If the shielding ratio of the detection range of the external sensor 2 due to the buildings, other vehicles, or the like is equal to or higher than a shielding threshold value, the system confidence degree calculation unit 26 may calculate the system confidence degree as a lower value compared to when the shielding ratio of the detection range of the external sensor 2 is lower than the shielding threshold value. The system confidence degree calculation unit 26 may recognize a marking object included in the detection range of the external sensor 2 on the map, based on the position of the vehicle on the map and the position information of the marking object included in the map information, and may compare the result of the recognition with the marking object (a stationary object) recognized by the external environment recognition unit 22. If a difference number obtained by subtracting the number of marking objects recognized by the external environment recognition unit 22 from the number of marking objects included in the detection range of external sensor 2 on the map is equal to or greater than a difference threshold value, the system confidence degree calculation unit 26 may calculate the system confidence degree as a lower value compared to when the difference number is less than the difference threshold value. The system confidence degree calculation unit 26 may recognize the number of marking objects included in the detection range of the external sensor 2 on the map in consideration of the shielding of the detection range of the external sensor 2 due to the buildings or the like.

The system confidence degree calculation unit 26 may calculate the system confidence degree based on a tracking situation of the moving objects such as other vehicles as the external environment of the vehicle. If the moving object being tracked within the detection range of external sensor 2 is lost, the system confidence degree calculation unit 26 may calculate the system confidence degree as a lower value compared to when the moving object is not lost. If at least one of the shape or the volume of the moving object being tracked is changed to equal to or higher than a certain percentage, since it is likely to erroneously recognize a plurality of objects as one moving object, the system confidence degree calculation unit 26 may calculate the system confidence degree as a lower value compared to when at least one of the shape and the volume of the moving object is not changed. If a relative speed of the moving object being tracked is changed suddenly, since it is likely to erroneously recognize the plurality of objects having different speed as one object, the system confidence degree calculation unit 26 may calculate the system confidence degree as a lower value compared to when the relative speed of the moving object is not changed suddenly. For example, when the speed change within a certain period of time is equal to or greater than a sudden change threshold value, the system confidence degree calculation unit 26 can recognize that the relative speed has suddenly changed.

If the external environment of the vehicle includes the result of the recognition of a traffic signal in front of the vehicle, and if the shape of the recognized traffic signal does not match the shape of the traffic signal stored in the map information (for example, when the recognized traffic signal is a three-light type with an arrow light, and the traffic signal stored in the map information is a three-light type without an arrow light), the system confidence degree calculation unit 26 may calculate the system confidence degree as a lower value compared to when the shape of the recognized traffic signal matches the shape of the traffic signal stored in the map information. The dimension of the traffic signal may be considered as well as the shape of the traffic signal. In addition, instead of the traffic signal, at least one of the shape and the dimension of the marking object may be used.

If the external environment of the vehicle includes the weather around the vehicle, the system confidence degree calculation unit 26 may calculate the system confidence degree as a lower value when the weather around the vehicle is rainy compared to when the weather around the vehicle is clear. The weather around the vehicle can be determined based on at least one of the imaging information by the camera and the result of the detection performed by the radar sensor. The weather around the vehicle may be determined based on an operation situation of the windshield wiper of the vehicle.

The system confidence degree calculation unit 26 may calculate the system confidence degree based on a degree of interference of the moving object with respect to the trajectory of the vehicle. The degree of interference of the moving object with respect to the trajectory of the vehicle can be calculated, for example, by using the method disclosed in Japanese Patent Publication No. 2007-230454. The system confidence degree calculation unit 26 calculates the system confidence degree as a lower value, for example, as the degree of interference of the moving object with respect to the trajectory of the vehicle becomes higher.

The system confidence degree calculation unit 26 may calculate the system confidence degree based on a degree of danger of the moving object around the vehicle. The degree of danger of the moving object around the vehicle can be calculated, for example, by using the method disclosed in Japanese Patent No. 2008-158969. The system confidence degree calculation unit 26 calculates the system confidence degree as a lower value, for example, as the degree of danger of the moving object with respect to the trajectory of the vehicle becomes higher.

The system confidence degree calculation unit 26 may calculate the system confidence degree based on the position of the vehicle on the map recognized by the vehicle position recognition unit 21. For example, if the position recognition of the vehicle is performed using a marking object in addition to the position information in the GPS receiver 1, the system confidence degree calculation unit 26 calculates the system confidence degree as a lower value compared to when the position of the vehicle is recognized using only the position information in the GPS receiver 1.

If the vehicle is positioned in the area where the accuracy of the map information is low, the system confidence degree calculation unit 26 may calculate the system confidence degree as a lower value compared to when the vehicle is positioned in other areas. The information regarding whether or not the accuracy of map information is low is associated with the map information in advance, for example. If the number of GPS satellites from which the GPS receiver 1 receives the signals is equal to or greater than a GPS threshold value, the system confidence degree calculation unit 26 may calculate the system confidence degree as a lower value compared to when the number of GPS satellites is less than the GPS threshold value. If the arrangement of the GPS satellites from which GPS receiver 1 receives the signals is dispersed, the system confidence degree calculation unit 26 may calculate the system confidence degree as a lower value compared to when the arrangement of the GPS satellites is concentrated.

If the number of the recognized marking objects positioned around the vehicle is less than a marking object threshold value, the system confidence degree calculation unit 26 may calculate the system confidence degree as a lower value compared to when the number of the recognized marking objects is equal to or greater than the marking object threshold value. If a positional relationship between a plurality of the recognized marking objects around the vehicle does not match a positional relationship between each of the marking objects in map information, the system confidence degree calculation unit 26 may calculate the system confidence degree as a lower value compared to when the positional relationship between the plurality of the recognized marking objects matches the positional relationship between each of the marking objects in the map information. When the positional relationship between the plurality of the recognized marking objects around the vehicle does not match the positional relationship between each of the marking objects in map information, and if an average of position errors of each marking object is shorter than a certain distance, the system confidence degree calculation unit 26 may calculate the system confidence degree as a lower value compared to when the average of the position errors of each marking object is equal to or longer than a certain distance. A median value or a total value may be used instead of the average.

When the vehicle is positioned in a complicated road environment such as intersections, crossings, merging points, and branches, the system confidence degree calculation unit 26 may calculate the system confidence degree as a lower value compared to when the vehicle is not positioned in the complicated road environment. If the vehicle is positioned in the poor visibility area set in the map information in advance, the system confidence degree calculation unit 26 calculates the system confidence degree as a lower value compared to when the vehicle is not positioned in the poor visibility area.

The system confidence degree calculation unit 26 may calculate the system confidence degree based on the travel state of the vehicle recognized by the travel state recognition unit 23. If the measurement result of the speed of the vehicle is an abnormal value, the system confidence degree calculation unit 26 may calculate the system confidence degree as a lower value compared to when the measurement result of the vehicle speed is not the abnormal value. For example, when a difference between the vehicle speed measured before one frame and the currently measured vehicle speed is equal to or higher than an abnormality detection threshold value (for example, 20 km/h or higher), the system confidence degree calculation unit 26 recognizes that the measured vehicle speed is the abnormal value. The same is applied to the acceleration and the yaw rate.

The system confidence degree calculation unit 26 may calculate the system confidence degree from the result of comparison between the travel state of the vehicle which is planned in the travel plan and the travel state of the vehicle which is recognized as a result of performing the autonomous driving control, based on the travel state of the vehicle recognized by the travel state recognition unit 23 and the travel plan generated by the travel plan generation unit 34. For example, if a deviation between the vehicle speed planned in the travel plan and the history of the vehicle speed as a result of autonomous driving control is equal to or greater than a deviation threshold value, the system confidence degree calculation unit 26 may calculate the system confidence degree as a lower value compared to when the deviation is less than the deviation threshold value. The same is applied to the acceleration and the yaw rate.

In addition, when abnormalities are detected in various sensors (the external sensor, the internal sensor, and the like) of the vehicle, the system confidence degree calculation unit 26 may calculate the system confidence degree as a lower value compared to when various sensors are normal. Well-known abnormality detection technology can be used for detecting the abnormalities of the sensors.

The system confidence degree calculation unit 26 calculates (predicts) the system confidence degree corresponding to the position (a future position) on the trajectory of the vehicle. The position on the trajectory of the vehicle is, for example, the position of the vehicle in the travel plan at a plurality of future times set in advance and separated by a predetermined time. The predetermined time may be, for example, 1 seconds, or may be 0.5 seconds. The predetermined time may be shorter as the speed of the vehicle increases. The number of future times need only be equal to or greater than two.

Alternatively, the position on the trajectory of the vehicle may be a plurality of positions separated by a predetermined interval starting from the vehicle on the trajectory of the vehicle. The predetermined interval may be, for example, 10 m, or may be 15 m. The number of positions for which the system confidence degree is calculated may be fixed or may be changed according to the speed of the vehicle. The number of positions for which the system confidence degree is calculated may increase as the speed of the vehicle increases.

The system confidence degree calculation unit 26 can calculate a future system confidence degree in the position on the trajectory of the vehicle by predicting the behavior of the moving objects around the vehicle based on the external environment of the vehicle. The system confidence degree calculation unit 26 estimates the number of moving objects around the vehicle for each position of the vehicle on the trajectory by, for example, predicting the behavior of the moving objects around the vehicle. If the estimated number of moving objects is equal to or greater than a certain number, the system confidence degree calculation unit 26 calculates the system confidence degree at that position as a lower value compared to when the estimated number of moving objects around the vehicle is less than the certain number.

The system confidence degree calculation unit 26 may determine whether or not there is a preceding vehicle within a certain distance from the vehicle for each position of the vehicle on the trajectory based on the prediction of the behavior of another vehicle around the vehicle, and then, may calculate the system confidence degree for each position of the vehicle on the trajectory based on the determination result of the presence or absence of the preceding vehicle. In addition, the system confidence degree calculation unit 26 may estimate the vehicle-to-vehicle distance between the vehicle and the preceding vehicle based on the prediction of the behavior of the preceding vehicle for each position of the vehicle on the trajectory, and may calculate the system confidence degree for each position of the vehicle on the trajectory based on the estimation result of the vehicle-to-vehicle distance between the vehicle and the preceding vehicle. The same can be applied to the calculation of the following vehicle and the parallel traveling vehicle.

The system confidence degree calculation unit 26 may estimate the time to collision between the vehicle and the moving object for each position of the vehicle on the trajectory to use the time to collision for calculating the system confidence degree. By considering the map information including the position information of the stationary object in addition to the prediction of the behavior of the moving objects, the system confidence degree calculation unit 26 may predict the shielding ratio of the detection range of external sensor 2 for each position of the vehicle of the trajectory to use the result of prediction for calculating the system confidence degree. The system confidence degree calculation unit 26 may calculate the system confidence degree for each position of the vehicle on the trajectory using at least one of the degree of interference of the moving object with respect to the trajectory of the vehicle described above and the degree of danger of the moving object around the vehicle.

The system confidence degree calculation unit 26 may calculate the system confidence degree for each position of the vehicle on the trajectory based on the map information. The system confidence degree calculation unit 26 predicts the number of marking objects that can be recognized for each position of the vehicle on the trajectory based on the map information, for example. If the number of marking objects that can be recognized at a certain position on the trajectory is less than a marking object threshold value, the system confidence degree calculation unit 26 may calculate the system confidence degree at that position as a lower value compared to when the number of marking objects is equal to or greater than the marking object threshold value. If the position of the vehicle on the trajectory is included in an area where the accuracy of the map information is low, the system confidence degree calculation unit 26 may calculate the system confidence degree at that position as a lower value compared to when the position is not included in the area where the accuracy of the map information is low. If the position of the vehicle on the trajectory is positioned in a complicated road environment, the same can be applied to the case where the position of the vehicle on the trajectory is positioned in an area having poor visibility.

The normal driving situation determination unit 27 determines whether or not autonomous driving is in the normal driving situation, based on at least one of the position of the vehicle on the map, the external environment of the vehicle, the travel state of the vehicle, and the trajectory of the vehicle. The normal driving situation is a situation in which autonomous driving is normally operated in the autonomous driving system 100. The fact that autonomous driving is in the normal driving situation means that the autonomous driving of the vehicle is normally operated, and means that it is not a situation in which the driving mode is switched to the driver-based driving due to the sudden termination of autonomous driving.

Specifically, the normal driving situation determination unit 27 determines whether or not autonomous driving is in the normal driving situation, based on the system confidence degree calculated from at least one of the position of the vehicle on the map, the external environment of the vehicle, the travel state of the vehicle, and the trajectory of the vehicle. For example, if the system confidence degree is equal to or higher than a normal driving threshold value, the normal driving situation determination unit 27 determines that autonomous driving is in the normal driving situation. If the system confidence degree is lower than the normal driving threshold value, the normal driving situation determination unit 27 determines that autonomous driving is not in the normal driving situation.

The normal driving situation determination unit 27 may determine whether or not autonomous driving is in the normal driving situation without using the system confidence degree. For example, if the shielding ratio of the detection range of the external sensor 2 due to the buildings, other vehicles, or the like is equal to or greater than the shielding threshold value, the normal driving situation determination unit 27 may determine that autonomous driving is not in the normal driving situation. In a sensor abnormality is detected in at least one of the external sensor 2 and the internal sensor 3, the normal driving situation determination unit 27 may determine that autonomous driving is not in the normal driving situation.

The normal driving situation determination unit 27 may determine whether or not autonomous driving is in the normal driving situation based on an accuracy of the recognition of the position of the vehicle on the map by the vehicle position recognition unit 21. The normal driving situation determination unit 27 obtains the accuracy of the recognition of the position of the vehicle on the map based on the number of the recognized marking objects positioned around the vehicle and/or the arrangement of the marking objects around the vehicle. If the accuracy of the recognition is lower than a recognition accuracy threshold value, the normal driving situation determination unit 27 determines that autonomous driving is not in the normal driving situation.

The normal driving situation determination unit 27 may determine whether or not autonomous driving is in the normal driving situation based on the trajectory generated by the trajectory generation unit 24. For example, if a deviation width (a distortion width) in the right and left direction of the trajectory within a certain distance is equal to or greater than a deviation width threshold value, the normal driving situation determination unit 27 determines that autonomous driving is not in the normal driving situation. If a difference between the speed upper limit and the speed lower limit in the trajectory within a certain distance is equal to or higher than a speed difference threshold value, the normal driving situation determination unit 27 may determine that autonomous driving is not in the normal driving situation.

In addition, the normal driving situation determination unit 27 may calculate a traveling safety degree of the trajectory generated by the trajectory generation unit 24 by using trajectory evaluation method disclosed in Japanese Unexamined Patent Publication No. 2009-157502. In this case, for example, if the traveling safety degree of the trajectory adopted for autonomous driving is lower than a traveling safety degree threshold value, the normal driving situation determination unit 27 can determine that autonomous driving is not in the normal driving situation.

The normal driving situation determination unit 27 may determine whether or not autonomous driving is in the normal driving situation by combining a plurality of criteria such as the shielding ratio of the detection range of external sensor 2, the accuracy of the recognition of the position of the vehicle on the map, the trajectory, and like described above, in addition to the system confidence degree. If it is determined that autonomous driving is not in the normal driving situation based on any one of the criteria, the normal driving situation determination unit 27 may determine that autonomous driving is not in the normal driving situation regardless of the result of the determination based on other criteria.

The driver situation recognition unit 28 recognizes a driver situation during autonomous driving. The result of the recognition of the driver situation is used in the distrust determination by the distrust determination unit 29 described below. The driver situation includes at least one of a driving action time of the driver, a non-driving action time of the driver, and a reaction delay time of the driver with respect to changes in the external environment of the vehicle. The driver situation recognition unit 28 recognizes the driver situation based on at least one of the driver's operation detected by the driving operation detection unit 5 and the driver image captured by the driver monitor camera 6. The driver situation may include a warning reaction delay time of the driver to the warning.

First, the driving action of the driver will be described. The driving action of the driver is an action for which the driver drives the vehicle. The driving action includes an action in which the driver grips the steering unit of the vehicle and an action in which the driver monitors the front of the vehicle and the like. The driver situation recognition unit 28 detects the driving action of the driver based on, for example, at least one of the driver's operation detected by the driving operation detection unit 5 and the driver image captured by the driver monitor camera 6. For example, if the driver is in a driving posture in which the driver grips the steering unit of the vehicle with both hands while the driver faces the front of the vehicle, the driver situation recognition unit 28 detects that the driver is performing a driving action. The driver situation recognition unit 28 recognizes the time when the driving action of the driver is detected, as the driving action time.

Next, the non-driving action time of the driver will be described. The non-driving action time of the driver is a time during which the driver is performing non-driving action. The non-driving action is an action that is not related to a driving action. The non-driving action includes looking aside, an operation of a smartphone, an operation of a vehicle facility (for example, an audio facility or a navigation system) and the like.

The driver situation recognition unit 28 recognizes the non-driving action time by detecting the non-driving action of the driver based on, for example, the driver image captured by the driver monitor camera 6. If the in-vehicle communication unit 8 is communicating with the driver's smartphone, the driver situation recognition unit 28 may detect the non-driving action of the driver from the operation information of the smartphone of the driver. The driver situation recognition unit 28 may detect the non-driving action of the driver using both the operation information of the smartphone of the driver and the driver image captured by the driver monitor camera 6.

The driver situation recognition unit 28 may detect the non-driving action of the driver from the operation information of the vehicle facility. If it is determined that the driver is concentrating on the conversation based on the result of the recognition performed by the voice recognition unit 7, the driver situation recognition unit 28 may detect such a situation as the non-driving action of the driver. The fact that the driver is concentrating on the conversation is a state in which, for example, the driver is speaking continuously with a voice of a certain volume or higher. The voice of the driver may be registered in the voice recognition unit 7 in advance. The driver situation recognition unit 28 may determine whether or not the driver is concentrating on the conversation by combining the driver image captured by the driver monitor camera 6 and the result of the recognition performed by the voice recognition unit 7.

Next, the reaction delay time of the driver to the changes in the external environment of the vehicle will be described. The changes in the external environment of the vehicle mean the changes in the external environment to which the driver takes reaction. The changes in the external environment of the vehicle include at least one of an interruption of another vehicle in front of the vehicle, running out of the pedestrian in front of the vehicle, an overtaking of another vehicle beside the vehicle, a rapid deceleration of the preceding vehicle, and the like. The driver situation recognition unit 28 recognizes that the changes in the external environment of the vehicle have occurred based on the external environment of the vehicle recognized by the external environment recognition unit 22.

The driver situation recognition unit 28 may distinguish and recognize the types of changes in the external environment of the vehicle. In this case, the interruption of another vehicle in front of the vehicle, the running out of the pedestrian in front of the vehicle, the overtaking of another vehicle beside the vehicle, and the rapid deceleration of the preceding vehicle can be recognized as a different type of changes of the external environment with each other. The running out of the pedestrian may be the same type as the running out of the moving objects such as a bicycle, a personal mobility, or another vehicle.

The reaction delay time of the driver is a delay time from the occurrence of the changes in the external environment of the vehicle to the reaction of the driver. For example, if the driver is in a driving posture in which the driver grips the steering unit of the vehicle with both hands while the driver faces the front of the vehicle, the driver situation recognition unit 28 detects that the driver takes the reaction to the changes in the external environment of the vehicle. The driver situation recognition unit 28 may detect that the driver takes the reaction when the driver faces the front of the vehicle, regardless of the situation of the driver's hand. Alternatively, the driver situation recognition unit 28 may detect that the driver takes the reaction when the driver grips the steering unit with both hands without recognizing the orientation of the driver's face.

In addition, the driver situation recognition unit 28 may detect that the driver takes the reaction when the driver moves the face so as to check the surroundings of the vehicle. When the brake sensor detects that the driver puts his/her foot on the brake pedal or when the accelerator sensor detects that the driver puts his/her foot on the accelerator pedal, the driver situation recognition unit 28 may detect that the driver takes the reaction.

If it is determined that the driver visually recognizes the changes in the external environment of the vehicle, the driver situation recognition unit 28 may detect that the driver takes the reaction. For example, if the changes in the external environment of the vehicle is another vehicle's overtaking, the driver situation recognition unit 28 detects that the driver takes the reaction to the overtaking of the other vehicle when the driver turns the face toward the other vehicle. If the reaction delay time of the driver to the changes in the external environment of the vehicle is recognized, the warning to the driver that will be described below is not performed. In addition, the driver situation recognition unit 28 may recognize driver's biometric information through the communication with the wearable device attached to the driver through the in-vehicle communication unit 8.

Next, the warning reaction delay time of the driver to the warning will be described. The warning is, for example, a notification for performing attention awakening to the driver of the changes in the external environment of the vehicle. The changes in the external environment of the vehicle in this case can also include at least one of the interruption of another vehicle in front of the vehicle, the running out of the pedestrian in front of the vehicle, the overtaking of another vehicle beside the vehicle, and the rapid deceleration of the preceding vehicle. The changes in the external environment of the vehicle means the changes in the external environment to which the driver takes reaction and the changes in the external environment of the vehicle which is a warning target do not necessarily need to match each other. For example, if the interruption of another vehicle in front of the vehicle is recognized, the autonomous driving system 100 performs the warning to the driver for attention awakening. The content of the warning will be described below.

The warning reaction delay time of the driver is a delay time from the output of the warning to the time of driver's reaction. The driver's reaction can be recognized in the same manner as the reaction delay time of the driver described above. If the warning is an image display, the driver situation recognition unit 28 may detect that the driver takes the reaction when the driver turns the face in the direction where the image is displayed. If the warning is a voice output, the driver situation recognition unit 28 may detect that the driver takes the reaction when the driver turns the face in the direction where the voice is output. The driver situation recognition unit 28 recognizes the time from the warning output to the time of the recognition of the driver's reaction as the warning reaction delay time of the driver to the warning. The driver situation recognition unit 28 does not necessarily need to recognize the reaction delay time and the warning reaction delay time.

The distrust determination unit 29 determines whether or not the driver is in the system distrust state based on the result of the recognition performed by the driver situation recognition unit 28. The system distrust state is a state in which the driver has a distrust with respect to autonomous driving by the autonomous driving system 100.

Specifically, the distrust determination unit 29 determines whether or not the driver is in the system distrust state based on the driving action time of the driver. The distrust determination unit 29 calculates a length of the driving action time of the driver in a certain period during autonomous driving. The distrust determination unit 29 determines that the driver is in the system distrust state when the length of the driving action time of the driver in a certain period is equal to or longer than the driving action threshold value. The driving action threshold value is a threshold value of a value set in advance.

Figure 2:
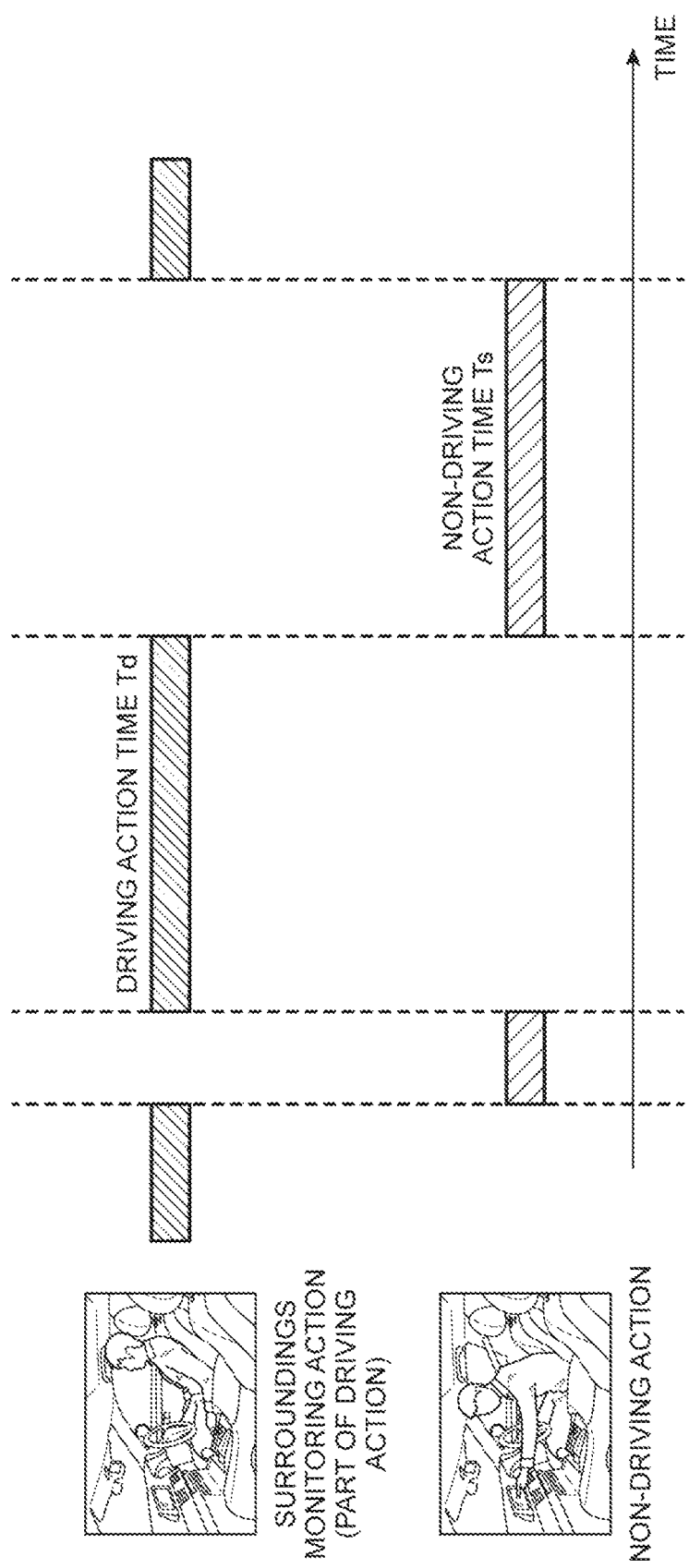
FIG. 2 is a diagram for explaining a driving action time and a non-driving action time.

Here, FIG. 2 is a diagram for explaining a driving action time and a non-driving action time. A driving action time Td and a non-driving action time Ts are illustrated in FIG. 2. In FIG. 2, when a driver's driving action is detected, the driver situation recognition unit 28 recognizes the time of driver's driving action as the driving action time Td. A surroundings monitoring action is a part of the driving action. If the driver's non-driving action is detected, the driver situation recognition unit 28 recognizes the time of driver's non-driving action as the non-driving action time Ts. As illustrated in FIG. 2, the driver's action during autonomous driving can be divided into the driving action and the non-driving action, for example. In the driver in the system distrust state, since it is considered that the driving action time Td in a certain period during autonomous driving increases, it is possible to determine whether or not the driver is in the system distrust state based on the driving action time Td.

In a situation illustrated in FIG. 2, the distrust determination unit 29 determines that the driver is in the system distrust state when, for example, the length of the driving action time Td of the driver in a certain period is equal to or longer than the driving action threshold value.

The distrust determination unit 29 may determine whether or not the driver is in the system distrust state based on the driver's non-driving action time Ts. The distrust determination unit 29 determines that the driver is in the system distrust state when the length of the non-driving action time Ts of the driver in a certain period is shorter than the non-driving action threshold value. The non-driving action threshold value is a threshold value of a value set in advance.

The distrust determination unit 29 may determine whether or not the driver is in the system distrust state based on the driving action time Td of the driver and the non-driving action time Ts of the driver. The distrust determination unit 29 calculates a ratio of the driving action time Td and the non-driving action time Ts in a certain period during autonomous driving. For example, if a ratio of non-driving action time Ts to the driving action time Td is less than a ratio threshold value, the distrust determination unit 29 determines that the driver is in the system distrust state. The ratio threshold value is a threshold value of a value set in advance. The ratio threshold value may be 0.2 or 0.3. A certain period may be several tens of minutes, one hour, or the entire period after autonomous driving starts.

The distrust determination unit 29 may determine whether or not the driver is in the system distrust state based on a result of comparison between the reaction delay time of the driver to the changes in the external environment of the vehicle and the warning reaction delay time of the driver. It is considered that the driver in the system distrust state is not just dependent on the warning from the autonomous driving system 100, but reacts quickly to changes in the external environment of the vehicle. Therefore, by comparing the reaction delay time of the driver to the changes in the external environment of the vehicle and the warning reaction delay time of the driver, it is possible to determine whether or not the driver is in the system distrust state.

In this case, first, if the driver situation recognition unit 28 recognizes the warning reaction delay time of the driver to the warning in accordance with the changes in the external environment of the vehicle, the distrust determination unit 29 stores the warning reaction delay time of the driver as a reference reaction delay time. The distrust determination unit 29 may store the reference reaction delay time in a storage device connected to the ECU 20.

Thereafter, if the driver situation recognition unit 28 recognizes the reaction delay time of the driver to the changes in the external environment of the vehicle, the distrust determination unit 29 calculates a difference obtained by subtracting the reaction delay time from the reference reaction delay time (stored warning reaction delay time). If the driver quickly responds to changes in the external environment, the difference obtained by subtracting the reaction delay time of the driver from the reference reaction delay time is a positive value, and it is considered that the difference increases as the driver reacts more quickly. If the difference obtained by subtracting the reaction delay time from the reference reaction delay time is equal to or greater than the distrust threshold value, the distrust determination unit 29 determines that the driver is in the system distrust state. The distrust threshold value is a threshold value having a positive value. The distrust threshold value may be changed in accordance with various parameters such as the speed of the vehicle or the brightness of the outside of the vehicle.

The distrust determination unit 29 may distinguish the types of changes in the external environment of the vehicle. The distrust determination unit 29 stores the warning reaction delay time of the driver for each type of the interruption of another vehicle in front of the vehicle, the running out of the pedestrian in front of the vehicle, the overtaking of another vehicle beside the vehicle, the rapid deceleration of the preceding vehicle, and the like. If the driver situation recognition unit 28 recognizes the reaction delay time of the driver to the changes in the external environment of the vehicle, the distrust determination unit 29 determines whether or not the driver is in the system distrust state by comparing the recognized reaction delay time of the driver with the warning reaction delay time corresponding to the type of change of the external environment.

The distrust determination unit 29 does not necessarily need to perform the comparison between the reaction delay time of the driver and the warning reaction delay time of the driver. The distrust determination unit 29 may determine whether or not the driver is in the system distrust state based on the reaction delay time of the driver to the changes in the external environment of the vehicle.

Specifically, the distrust determination unit 29 stores the reaction delay time for the comparison for each type of the changes in the external environment of the vehicle. If the reaction delay time of the driver to the changes in the external environment of the vehicle is recognized, the distrust determination unit 29 calculates a difference obtained by subtracting the reaction delay time of the driver from the reaction delay time for comparison corresponding to the type of change of the external environment. If the difference obtained by subtracting the reaction delay time of the driver from the reaction delay time for comparison is equal to or greater than the distrust threshold value, the distrust determination unit 29 may determine that the driver is in the system distrust state. The distrust determination unit 29 may use the reaction delay time for comparison having different values depending on the type of changes in the external environment of the vehicle.

Similarly, the distrust determination unit 29 may determine whether or not the driver is in the system distrust state based on the warning reaction delay time of the driver to the warning corresponding to the changes in the external environment of the vehicle. The distrust determination unit 29 stores the warning reaction delay time for comparison, in advance. If the warning reaction delay time of the driver is recognized, the distrust determination unit 29 calculates a difference obtained by subtracting the warning reaction delay time of the driver from the warning reaction delay time for comparison. If the difference obtained by subtracting the warning reaction delay time of the driver from the warning reaction delay time for comparison is equal to or greater than the distrust threshold value, the distrust determination unit 29 may determine that the driver is in the system distrust state. The distrust determination unit 29 may use the warning reaction delay time for comparison having different values depending on the type of changes in the external environment of the vehicle.

In addition, the distrust determination unit 29 may determine the system distrust state based on the biometric information of the driver recognized by the driver situation recognition unit 28, in addition to the driving action time. The distrust determination unit 29 may determine the system distrust state by using the biometric information of the driver in combination with the driving action time, or the like. If an armrest sensor that measures the weight of the driver's arm is provided on the armrest of the driver's seat, the distrust determination unit 29 may determine the system distrust state using the result of measurement performed by the armrest sensor in combination with the driving action time, or the like. When the driver does not lean on the armrest, it can be considered that the driver is more likely to be in the system distrust state than when the driver leans on the armrest.

The anxiety elicitation situation determination unit 30 determines whether or not the vehicle during autonomous driving is in an anxiety elicitation situation, based on the external environment of the vehicle. The anxiety elicitation situation is a situation of the vehicle that causes an anxiety to the driver of the vehicle. The anxiety elicitation situation is determined from the viewpoint of the driver. Examples of the anxiety elicitation situation include a situation in which another vehicle is trying to interrupt in front of the vehicle within the driver's field of view and the vehicle and the other vehicle are close to each other.

For example, based on the image captured by the camera that captures the front of the vehicle, if the area of the moving object in the captured image is equal to or greater than the anxiety elicitation threshold value, the anxiety elicitation situation determination unit 30 determines that the vehicle during autonomous driving is in the anxiety elicitation situation. The area of the moving object is an area occupied by the moving objects such as other vehicles, pedestrians, bicycles (movable obstacles), and the like in the captured image. The anxiety elicitation situation determination unit 30 can determine the anxiety elicitation situation based on the area of the moving object, from a fact that the driver is likely to be more anxious about the situation of the vehicle as the area of the moving object that occupies the field of view of the driver increases.

Figure 3:
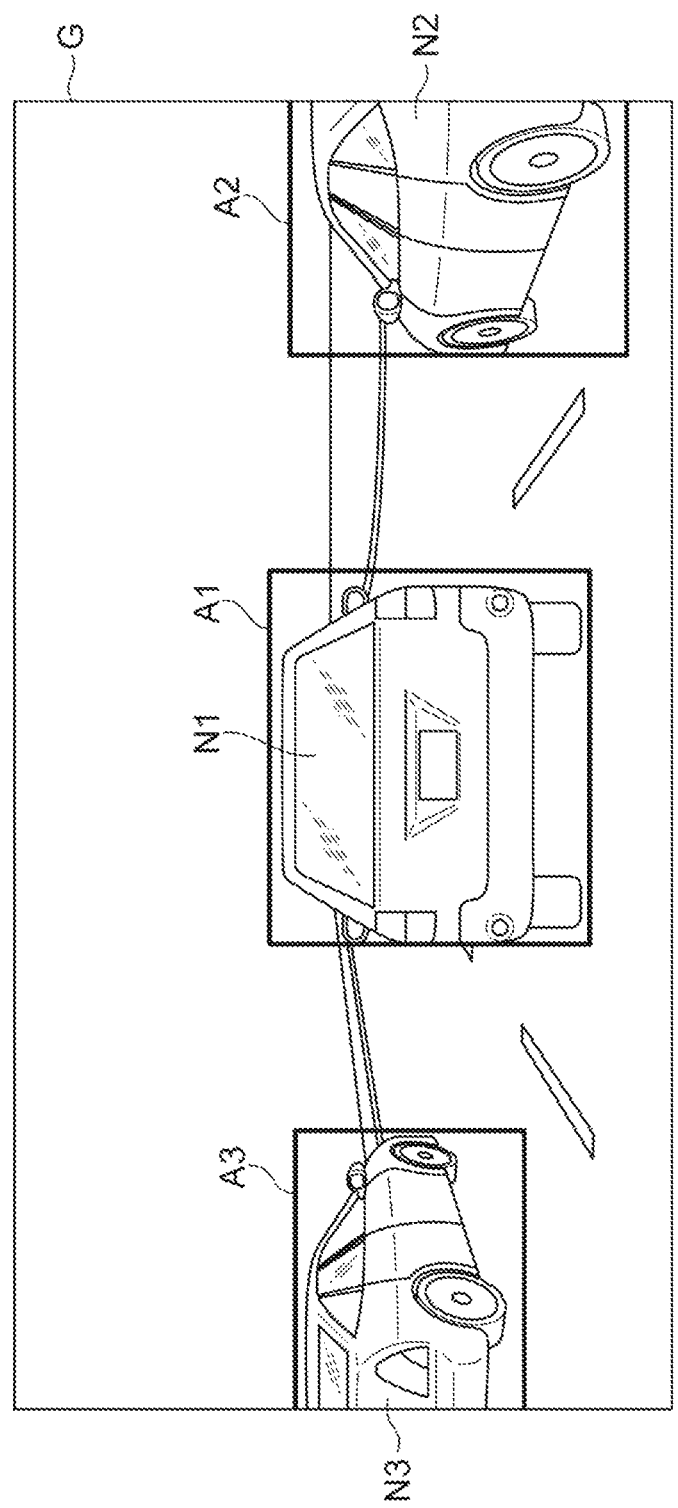
FIG. 3 is a diagram for explaining an example of an anxiety elicitation situation.

Here, FIG. 3 is a diagram for explaining an example of the anxiety elicitation situation. FIG. 3 illustrates an image G captured by a camera, a preceding vehicle N1, a right side other vehicle N2, and a left side other vehicle N3. Furthermore, FIG. 3 illustrates an image area A1 of the preceding vehicle N1, an image area A2 of the right side other vehicle N2, and an image area A3 of the left side other vehicle N3. The area of the moving object is the total area of the image areas A1 to A3.

In the situation in FIG. 3, the anxiety elicitation situation determination unit 30 recognizes an area of the moving object (the total area of the image areas A1 to A3) in the image G captured by the camera, based on the external environment of the vehicle recognized by the external environment recognition unit 22. If the area of the moving object is equal to or greater than the anxiety elicitation threshold value, the anxiety elicitation situation determination unit 30 determines that the vehicle is in the anxiety elicitation situation. The anxiety elicitation threshold value may be changed in accordance with various parameters such as at least one of the speed of the vehicle and the brightness of the outside of the vehicle. Well-known image recognition technology may be used to recognize the area of the moving object in the captured image.

The anxiety elicitation situation determination unit 30 may determine that the vehicle is in the anxiety elicitation situation when the area of the moving object suddenly increases. For example, if the increase in the area of the moving object within a certain period of time is equal to or greater than an area increase threshold value, the anxiety elicitation situation determination unit 30 determines that the vehicle is in the anxiety elicitation situation.

In addition, the anxiety elicitation situation determination unit 30 may consider the area of not only the image captured by the camera that images the front of the vehicle but also the area of the moving object in the image captured by a camera that images at least one of the side or rear of the vehicle. For example, if the area of the moving object, which is the sum of the image areas of the moving objects captured by all the cameras that images the outside of the vehicle, is equal to or greater than the anxiety elicitation threshold value, the anxiety elicitation situation determination unit 30 may determine that the vehicle during autonomous driving is in the anxiety elicitation situation.

The anxiety elicitation situation determination unit 30 does not necessarily need to determine the anxiety elicitation situation based on the area of the moving object. The anxiety elicitation situation determination unit 30 may determine the anxiety elicitation situation while considering the density of other vehicles around the vehicle, types of other vehicles around the vehicle, and a sound around the vehicle. As an example, an anxiety elicitation degree can be used. If the anxiety elicitation degree is equal to or higher than an anxiety elicitation degree threshold value, the anxiety elicitation situation determination unit 30 determines that the vehicle is in the anxiety elicitation situation.

The anxiety elicitation situation determination unit 30 calculates the anxiety elicitation degree as a large value when the type of the other vehicle positioned within a certain distance from the vehicle is a large size vehicle such as a truck, compared to when the type of the other vehicle is a small size vehicle. The anxiety elicitation situation determination unit 30 may calculate the anxiety elicitation degree as a large value when the type of other vehicle positioned within a certain distance from the vehicle is a wide vehicle such as a luxury car, compared to when the type of other vehicle is a small size vehicle.

The anxiety elicitation situation determination unit 30 may calculate the anxiety elicitation degree as a large value when the type of other vehicle positioned within a certain distance from the vehicle is a motorcycle, compared to when the type of the other vehicle is a small size vehicle. The anxiety elicitation situation determination unit 30 may calculate the anxiety elicitation degree as a larger value as the number of other vehicles present within a certain distance from the vehicle increases. The anxiety elicitation situation determination unit 30 may calculate the anxiety elicitation degree as a larger value as a noise level (for example, decibel) of the sound around the vehicle is higher. The anxiety elicitation situation determination unit 30 may calculate the anxiety elicitation degree as a larger value when the approaching sound of a large vehicle is detected, compared to when the approaching sound of a large vehicle is not detected. The anxiety elicitation situation determination unit 30 may calculate the anxiety elicitation degree as a larger value when a siren sound of a special vehicle such as an emergency vehicle or a police vehicle is detected, compared to when the siren sound of the special vehicle is not detected. The anxiety elicitation situation determination unit 30 may calculate the anxiety elicitation degree as a large value when there is a sound having noise level equal to or higher than a noise threshold value even if the sound is generated from a construction site or the like, compared to when there is no sound having noise level equal to or higher than the noise threshold value.

In addition, the anxiety elicitation situation determination unit 30 may determine the anxiety elicitation situation by collating the external environment of the vehicle with data in a determination database prepared in advance. In the determination database, for example, the external environment of the vehicle which is determined as the anxiety elicitation situation is stored as data. For example, when the external environment (the image captured by the camera, the arrangement of other vehicles around the vehicle detected by the radar sensor, and the like) of the vehicle matches the data in the determination database, the anxiety elicitation situation determination unit 30 determines that the vehicle is in the anxiety elicitation situation. The method for generating the determination database is not particularly limited.

The warning control unit 31 performs various warnings to the driver during autonomous driving. The warning control unit 31 performs various warnings by transmitting various control signals to the HMI 10. The warning is performed by at least one of the image display on the display 10a, the voice output from the speaker 10b, and the output of the vibration by the vibrator 10c of the HMI 10. The warning may be performed by combining two or more of the image display, the voice output, and the vibration.

The warning control unit 31 outputs an alert under certain conditions. Specifically, the warning control unit 31 outputs the alert when the normal driving situation determination unit 27 determines that autonomous driving is in the normal driving situation, the distrust determination unit 29 determines that the driver is in the system distrust state, and the anxiety elicitation situation determination unit 30 determines that the vehicle during autonomous driving is in the anxiety elicitation situation.

The alert described above is an alert to eliminate the system distrust state for the driver. The alert is output according to the external environment of the vehicle. The content of the alert is not limited as long as the alert can contribute to eliminate the driver's system distrust state as much as possible. The alert may be a more thorough alert as compared to when it is determined that the driver is not in the system distrust state, to eliminate the system distrust state for the driver. Examples of the thorough alert include an early alert that performs attention awakening to the driver that there is a risk such as obstacles, prior to the normal attention awakening alert.

The alert includes at least one of the alert by the display, the alert by the sound, and the alert by the vibration. The alert may be performed by combining two or more of the alert by the display, the alert by the sound, and the alert by the vibration.

The alert by the display includes the image display by the display 10a of the HMI 10. The alert by the display may be a projection display on the windshield of the vehicle using a head-up display. The alert by the display may be an image display on a multi-information display, or an image display on a blind spot monitor provided on a side mirror of the vehicle. The alert by the display may include an image display on a screen such as a driver's smartphone communicating with the vehicle via the in-vehicle communication unit 8. The display content may be displayed with an icon or displayed with a text. The display content is not limited as long as the content can contribute to the elimination of the driver's system distrust state.

The alert by the sound includes a voice output from the speaker 10b. The alert by the sound includes at least one of the alarm sound and the voice. The alarm sound may be a continuous sound or an intermittent sound. The type and the content of the voice are not limited as long as the voice can contribute to the elimination of the driver's system distrust state.

The alert by the vibration includes the output of vibration from the vibrator 10c. The alert by the vibration includes at least one of vibration of a steering unit, vibration of a driver's seat, vibration of a driver's headrest, vibration of a driver's armrest, vibration of an accelerator pedal, and vibration of a brake pedal.

For example, the warning control unit 31 does not output the alert when the normal driving situation determination unit 27 determines that autonomous driving is not in the normal driving situation, when the distrust determination unit 29 determines that the driver is not in the system distrust state, or when the anxiety elicitation situation determination unit 30 determines that the vehicle during autonomous driving is not in the anxiety elicitation situation.

The warning control unit 31 outputs the alert in accordance with the external environment of the vehicle when the normal driving situation determination unit 27 determines that autonomous driving is in the normal driving situation, the distrust determination unit 29 determines that the driver is in the system distrust state, and the anxiety elicitation situation determination unit 30 determines that the vehicle during autonomous driving is in the anxiety elicitation situation. The warning control unit 31 does not output the alert when the external environment is not to be notified to the driver. Examples of the external environment to be notified to the driver include an environment in which the obstacles are present in front of the vehicle, and a road traffic environment to be noted in front of the vehicle. Examples of the external environment to be notified to the driver include an environment in which the pedestrians or bicycles are present around the vehicle.

Processing of Autonomous Driving System

Next, the processing by autonomous driving system 100 in the present embodiment will be described with reference to the drawings.

Autonomous Driving Processing

Figure 4:
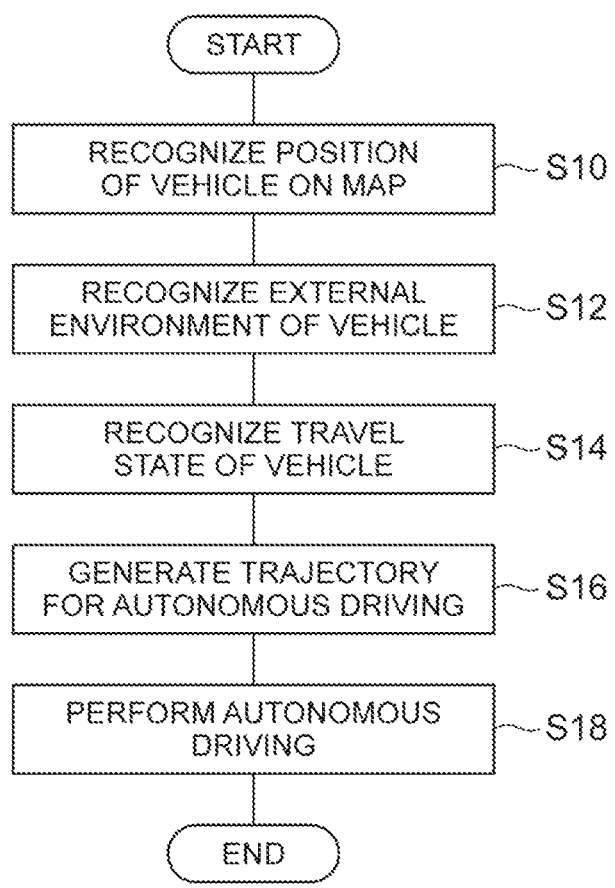
FIG. 4 is a flowchart illustrating an example of autonomous driving processing.

FIG. 4 is a flowchart illustrating an example of the autonomous driving processing. The autonomous driving processing illustrated in FIG. 4 is performed when autonomous driving of the vehicle is started.

As illustrated in FIG. 4, as S10, the ECU 20 of the autonomous driving system 100 recognizes the position of the vehicle on the map by using the vehicle position recognition unit 21. The vehicle position recognition unit 21 recognizes the position of the vehicle on the map based on the position information in the GPS receiver 1 and the map information in the map database 4. In addition, the vehicle position recognition unit 21 may estimate the position of the vehicle on the map using SLAM technology or the like.

In S12, the ECU 20 recognizes the external environment of the vehicle by using the external environment recognition unit 22. The external environment recognition unit 22 recognizes the external environment of the vehicle based on the result of the detection performed by the external sensor 2.

In S14, the ECU 20 recognizes the travel state of the vehicle by using the travel state recognition unit 23. The travel state recognition unit 23 recognizes the state of the traveling vehicle based on the result of the detection performed by the internal sensor 3.

In S16, the ECU 20 generates a trajectory for autonomous driving by using the trajectory generation unit 24. The trajectory generation unit 24 generates the trajectory for autonomous driving based on the destination set in advance, the map information, the position of the vehicle on the map, the external environment of the vehicle, and the travel state of the vehicle.

In S18, the ECU 20 performs autonomous driving by using the vehicle control unit 25. The vehicle control unit 25 performs autonomous driving of the vehicle based on the map information, the position of the vehicle on the map, the external environment of the vehicle, the travel state of the vehicle, and the trajectory.

Alert Output Processing

Figure 5:
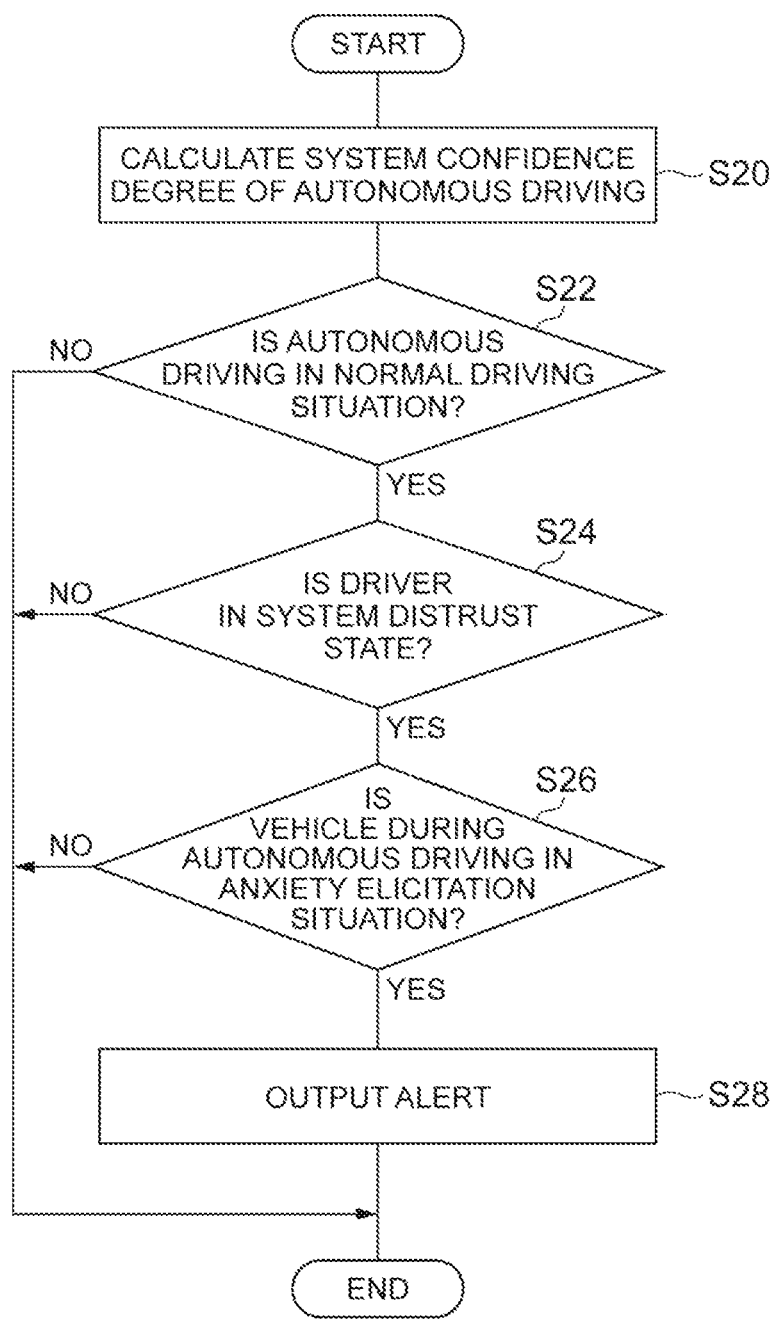
FIG. 5 is a flowchart illustrating an example of alert output processing.

FIG. 5 is a flowchart illustrating an example of the alert output processing. The alert output processing illustrated in FIG. 5 is performed during autonomous driving of the vehicle. The alert output processing may be started after a certain period of time has elapsed since autonomous driving of the vehicle is started or after traveling a certain distance.

As illustrated in FIG. 5, as S20, the ECU 20 calculates the system confidence degree of autonomous driving by using the system confidence degree calculation unit 26. The system confidence degree calculation unit 26 calculates the system confidence degree based on at least one of the position of the vehicle on the map, the external environment of the vehicle, the travel state of the vehicle, and the trajectory of the vehicle.

In S22, the ECU 20 determines whether or not autonomous driving is in the normal driving situation by using the normal driving situation determination unit 27. The normal driving situation determination unit 27 determines whether or not autonomous driving is in the normal driving situation, based on at least one of the position of the vehicle on the map, the external environment of the vehicle, the travel state of the vehicle, and the trajectory of the vehicle. If it is determined that autonomous driving is in the normal driving situation (YES in S22), the ECU 20 makes the process proceed to S24. If it is determined that autonomous driving is not in the normal driving situation (NO in S22), the ECU 20 ends the current processing. Thereafter, when autonomous driving is continued, the ECU 20 repeats the processing from S20 again after a predetermined time has elapsed.

In S24, the ECU 20 determines whether or not the driver is in the system distrust state by using the distrust determination unit 29. The distrust determination unit 29 determines whether or not the driver is in the system distrust state based on the driving situation of the driver. Details of the system distrust state determination processing will be described below.

If it is determined that the driver is in the system distrust state (YES in S24), the ECU 20 makes the process proceed to S26. If it is determined that the driver is not in the system distrust state (NO in S24), the ECU 20 ends the current processing. Thereafter, when autonomous driving is continued, the ECU 20 repeats the processing from S20 again after a predetermined time has elapsed.

In S26, the ECU 20 determines whether or not the vehicle during autonomous driving is in the anxiety elicitation situation by using the anxiety elicitation situation determination unit 30. For example, based on the image captured by the camera that captures the front of the vehicle, if the area of the moving object in the captured image is equal to or greater than the anxiety elicitation threshold value, the anxiety elicitation situation determination unit 30 determines that the vehicle during autonomous driving is in the anxiety elicitation situation. The details of the anxiety elicitation situation determination processing will be described below.

If it is determined that the vehicle during autonomous driving is in the anxiety elicitation situation (YES in S26), the ECU 20 makes the process proceed to S28. If it is determined that the vehicle during autonomous driving is not in the anxiety elicitation situation (NO in S26), the ECU 20 ends the current processing. That is, The ECU 20 does not output the alert when it is determined that the vehicle during autonomous driving is in the anxiety elicitation situation. Thereafter, when autonomous driving is continued, the ECU 20 repeats the processing from S20 again after a predetermined time has elapsed.

In S28, the ECU 20 outputs the alert by using the warning control unit 31. The warning control unit 31 outputs the alert by transmitting a control signal to the HMI 10. Thereafter, the ECU 20 ends the current processing. The ECU 20 repeats the processing from S20 again after a predetermined standby time has elapsed.

System Distrust State Determination Processing

FIG. 6 is a flowchart illustrating an example of the system distrust state determination processing. The system distrust state determination processing corresponds to the processing in S24 illustrated in FIG. 5.

As illustrated in FIG. 6, ECU 20 recognizes the driving action time by using the driver situation recognition unit 28 as S30. The driver situation recognition unit 28 recognizes the driving action time of the driver based on, for example, at least one of the driver's operation detected by the driving operation detection unit 5 and the driver image captured by the driver monitor camera 6.

The ECU 20 determines whether or not the length of the driving action time of the driver in a certain period is equal to or longer than the driving action threshold value by using the distrust determination unit 29 as S32. If it is determined that the length of the driving action time of the driver in a certain period is equal to or longer than the driving action threshold value (YES in S32), the ECU 20 makes the process proceed to S34. If it is determined that the length of the driving action time of the driver in a certain period is not equal to or longer than the driving action threshold value (NO in S32), the ECU 20 makes the process proceed to S36.

In S34, the ECU 20 determines that the driver is in the system distrust state by using the distrust determination unit 29. In S36, the ECU 20 determines that the driver is not in the system distrust state by using the distrust determination unit 29.

Reference Reaction Delay Time Storage Processing

FIG. 7A is a flowchart illustrating an example of the reference reaction delay time storage processing. The reference reaction delay time storage processing is the premise processing of another example of the system distrust state determination processing described below. The reference reaction delay time storage processing is performed during autonomous driving of the vehicle.

As illustrated in FIG. 7A, as S40, the ECU 20 determines whether or not the warning is performed by using the warning control unit 31. The warning control unit 31 performs warning to the driver by transmitting a control signal to the HMI 10. The warning to be determined may be limited to the warning with respect to the changes in the external environment of the vehicle. If the warning is performed (YES in S40), the ECU 20 makes the process proceed to S42. If the warning is not performed (NO in S40), the ECU 20 ends the current processing. Thereafter, when autonomous driving is continued, the ECU 20 repeats the processing from S40 again after a predetermined time has elapsed.

In S42, the ECU 20 recognizes the warning reaction delay time of the driver to the warning by using the driver situation recognition unit 28. The driver situation recognition unit 28 recognizes the time from the warning output to the time of the recognition of the driver's reaction as the warning reaction delay time of the driver to the warning.

In S44, the ECU 20 stores the warning reaction delay time of the driver as a reference reaction delay time by using the distrust determination unit 29. The distrust determination unit 29 may store the reference reaction delay time in a storage device connected to the ECU 20.

Thereafter, the ECU 20 ends the current processing. The ECU 20 may update the reference reaction delay time by repeating the processing from S40 again after a predetermined standby time has elapsed.

Another Example of System Distrust State Determination Processing

FIG. 7B is a flowchart illustrating another example of the system distrust state determination processing. The system distrust state determination processing corresponds to the processing in S24 illustrated in FIG. 5.

As illustrated in FIG. 7B, as S50, the ECU 20 detects the changes in the external environment of the vehicle by using the external environment recognition unit 22. The external environment recognition unit 22 detects the changes in the external environment of the vehicle based on the result of the detection performed by the external sensor 2. If the changes in the external environment of the vehicle are detected (YES in S50), the ECU 20 makes the process proceed to S52. If the changes in the external environment of the vehicle are not detected (NO in S50), the ECU 20 ends the current processing. Thereafter, when autonomous driving is continued, the ECU 20 repeats the processing from S50 again after a predetermined time has elapsed.

In S52, the ECU 20 recognizes the reaction delay time of the driver to the changes in the external environment of the vehicle by the driver situation recognition unit 28. The driver situation recognition unit 28 recognizes the reaction delay time of the driver to the changes in the external environment of the vehicle based on at least one of operation by the driver detected by the driving operation detection unit 5 and the driver image captured by the driver monitor camera 6.

In S54, the ECU 20 determines whether or not the difference between the reaction delay time of the driver and the reference reaction delay time is equal to or greater than the distrust threshold value by using the distrust determination unit 29. The difference between the reaction delay time of the driver and the reference reaction delay time refers to a difference obtained by subtracting the reaction delay time of the driver from the reference reaction delay time. If it is determined that the difference between the reaction delay time of the driver and the reference reaction delay time is equal to or greater than the distrust threshold value (YES in S54), the ECU 20 makes the process proceed to S56. If it is determined that the difference between the reaction delay time of the driver and the reference reaction delay time is not equal to or greater than the distrust threshold value (NO in S54), the ECU 20 makes the process proceed to S58.

In S56, the ECU 20 determines that the driver is in the system distrust state by using the distrust determination unit 29. In S58, the ECU 20 determines that the driver is not in the system distrust state by using the distrust determination unit 29.

When both the determination processing of FIG. 6 and the determination processing of FIG. 7B are performed, even if it is determined that the driver is in the system distrust state in any one determination processing and it is determined that the driver is not in the system distrust state in the other determination processing, the ECU 20 may prioritize the determination result of the system distrust state. Alternatively, the ECU 20 may prioritize the result of the determination processing of FIG. 6, and may prioritize the result of the determination processing of FIG. 7B. Also, the ECU 20 does not necessarily need to perform both the determination processing of FIG. 6 and the determination processing of FIG. 7B.

Anxiety Elicitation Situation Determination Processing

FIG. 8 is a flowchart illustrating an example of the anxiety elicitation situation determination processing. The anxiety elicitation situation determination processing corresponds to the processing in S26 illustrated in FIG. 5.

As illustrated in FIG. 8, as S60, the ECU 20 determines whether or not the area of the moving object in the image captured by the camera that images the front of the vehicle is equal to or greater than the anxiety elicitation threshold value by using the anxiety elicitation situation determination unit 30. The anxiety elicitation situation determination unit 30 performs the above-described determination based on the image captured by the camera that images the front of the vehicle. If it is determined that the area of the moving object in the image captured by the camera is equal to or greater than the anxiety elicitation threshold value (YES in S60), the ECU 20 makes the process proceed to S62. If it is determined that the area of the moving object in the image captured by the camera is not equal to or greater than the anxiety elicitation threshold value (NO in S60), the ECU 20 makes the process proceed to S64.

In S62, the ECU 20 determines that the vehicle during autonomous driving is in the anxiety elicitation situation by using the anxiety elicitation situation determination unit 30. In S64, the ECU 20 determines that the vehicle during autonomous driving is not in the anxiety elicitation situation by the anxiety elicitation situation determination unit 30.

Operational Effect of Autonomous Driving System

According to the autonomous driving system 100 according to the present embodiment described above, the alert is output in accordance with the external environment of the vehicle when the normal driving situation determination unit 27 determines that autonomous driving is in the normal driving situation, the distrust determination unit 29 determines that the driver is in the system distrust state, and the anxiety elicitation situation determination unit 30 determines that the vehicle during autonomous driving is in the anxiety elicitation situation. In this way, in the autonomous driving system 100, it is possible to appropriately eliminate the system distrust state of the driver during autonomous driving by encouraging the driver who is in the system distrust state by outputting the alert in accordance with the external environment while ensuring that autonomous driving is in the normal driving situation. According to the autonomous driving system 100, since the driver may feel anxious about the external environment of the vehicle when it is determined that the vehicle is in the anxiety elicitation situation, it is possible to appropriately eliminate the system distrust state of the driver by outputting the alert.

Furthermore, according to the autonomous driving system 100, by determining the normal driving situation of autonomous driving by using the system confidence degree regarding autonomous driving, it is possible to appropriately determine whether or not autonomous driving is in the normal driving situation compared to when the system confidence degree is not used.

In addition, according to the autonomous driving system 100, since the driver is likely to feel more anxious about the traveling of the vehicle as the area of the obstacle that occupies the field of view of the driver seeing the front of the vehicle increases, if the area of the moving object in the image captured by the camera that images the front of the vehicle is equal to or greater than the anxiety elicitation threshold value, it is possible to determine that the vehicle during autonomous driving is in the anxiety elicitation situation.

As described above, the embodiments of the present disclosure were described, however, the present disclosure is not limited to the embodiments described above. In addition to the above-described embodiments, the present disclosure can be embodied in various forms including various modifications and improvements based on the knowledge of those skilled in the art.

The distrust determination unit 29 may determine whether or not the driver is not in the system distrust state based on the driver's driving action time Td when the anxiety elicitation situation determination unit 30 determines that the vehicle during autonomous driving is in the anxiety elicitation situation. Since the driver is likely to be in the system distrust state when the ratio of the driver's driving action under the situation that is not the anxiety elicitation situation is high, the distrust determination unit 29 can determine whether or not the driver is in the system distrust state based on the driver's driving action time Td under the situation that is not the anxiety elicitation situation. The distrust determination unit 29 determines that the driver is in the system distrust state when, for example, the length of the driving action time Td of the driver under the situation that is not the anxiety elicitation situation is equal to or longer than a first distrust determination threshold value.

Similarly, the distrust determination unit 29 may determine whether or not the driver is in the system distrust state based on the non-driving action time Ts of the driver under the situation that is not the anxiety elicitation situation. The distrust determination unit 29 may determine that the driver is in the system distrust state when the length of the non-driving action time Ts of the driver under the situation that is not the anxiety elicitation situation is shorter than a second distrust determination threshold value. The first distrust determination threshold value and the second distrust determination threshold value are the threshold values set in advance.

The autonomous driving system 100 does not necessarily need to include the system confidence degree calculation unit 26. That is, the autonomous driving system 100 does not necessarily need to calculate the system confidence degree. In this case, the normal driving situation determination unit 27 need only determine whether or not autonomous driving is in the normal driving situation based on at least one of the position of the vehicle on the map, the external environment of the vehicle, the travel state of the vehicle, and the trajectory of the vehicle, without using the system confidence degree.

The autonomous driving system 100 does not necessarily need to include the anxiety elicitation situation determination unit 30. That is, the autonomous driving system 100 does not necessarily need to determine whether or not the vehicle during autonomous driving is in the anxiety elicitation situation. In this case, when the normal driving situation determination unit 27 determines that autonomous driving is in the normal driving situation and the distrust determination unit 29 determines that the driver is in the system distrust state, the warning control unit 31 outputs the alert. If the normal driving situation determination unit 27 determines that autonomous driving is not in the normal driving situation, or if the distrust determination unit 29 determines that the driver is not in the system distrust state, the warning control unit 31 does not output the alert.

The driver situation recognition unit 28 may recognize the driver's reaction to the alert after the alert is output. The warning control unit 31 may output the alert again if the driver's reaction to the alert is not recognized. When the alert is output again, the warning control unit 31 may output the alert strongly compared to the alert output previously. The strong output is, for example, an output with a larger volume when voice output, and an output of strong luminance when image display. The strong output may be realized by changing the frequency of the voice and the chromaticity of the image. The distrust determination unit 29 may determine that the system distrust state of the driver is eliminated, when the reaction of the driver to the alert is recognized.

What is claimed is:

1. An autonomous driving system that performs autonomous driving of a vehicle and performs various warnings to a driver of the vehicle during autonomous driving, the system comprising an electronic control unit configured to:
   recognize a position of the vehicle on a map;
   recognize an external environment of the vehicle;
   recognize a travel state of the vehicle;
   generate a trajectory of the vehicle used for the autonomous driving, based on map information, the position of the vehicle on the map, the external environment of the vehicle, and the travel state of the vehicle;
   determine whether or not autonomous driving is in a normal driving situation, based on at least one of the position of the vehicle on the map, the external environment of the vehicle, the travel state of the vehicle, and the trajectory of the vehicle;
   recognize a driver situation including at least one of a driving action time of the driver, a non-driving action time of the driver, and a reaction delay time of the driver with respect to a change in the external environment of the vehicle;
   calculate an amount of time that the driver performs a driving action during a predetermined period of time during autonomous driving, the driving action comprising the driver gripping a steering unit of the vehicle with both hands while facing a front of the vehicle;
   determine that the driver is in a system distrust state when the calculated amount of time is greater than or equal to a predetermined threshold value;
   determine an anxiety elicitation degree based on the external environment of the vehicle;
   determine whether or not the vehicle during autonomous driving is in an anxiety elicitation situation based on whether or not the anxiety elicitation degree is above a predetermined threshold; and
   output an alert to eliminate the system distrust state for the driver in accordance with the external environment of the vehicle upon determination that the vehicle is in the anxiety elicitation situation in a case where autonomous driving is in the normal driving situation and upon determination that the driver is in the system distrust state, and not output the alert upon determination that the vehicle is not in the anxiety elicitation situation, in a case where autonomous driving is in the normal driving situation and the driver is in the system distrust state.

2. The autonomous driving system according to claim 1, wherein the electronic control unit is further configured to:
   calculate a system confidence degree regarding the autonomous driving based on at least one of the position of the vehicle on the map, the external environment of the vehicle, the travel state of the vehicle, and the trajectory of the vehicle, and determine that autonomous driving is not in the normal driving situation, when the system confidence degree is lower than a normal driving threshold value.

3. The autonomous driving system according to claim 1, wherein the electronic control unit determines that the vehicle during autonomous driving is in the anxiety elicitation situation, if an area of a moving object in a captured image by a camera that images the front of the vehicle as the external environment of the vehicle is equal to or greater than an anxiety elicitation threshold value.

4. The autonomous driving system according to claim 1, wherein the electronic control unit is further configured to determine that the anxiety elicitation degree is a larger value as a noise level of sound around the vehicle is higher.

5. The autonomous driving system according to claim 1, wherein the electronic control unit is further configured to determine that the anxiety elicitation degree is a larger value when an approaching sound of a large vehicle is detected, compared to when the approaching sound of the large vehicle is not detected.

6. The autonomous driving system according to claim 1, wherein the electronic control unit is further configured to determine that the anxiety elicitation degree is a larger value when a siren sound of an emergency vehicle or a police vehicle is detected, compared to when the siren sound of the emergency vehicle or the police vehicle is not detected.

\* \* \* \* \*